US010473462B2

United States Patent
Nishita et al.

(10) Patent No.: US 10,473,462 B2
(45) Date of Patent: *Nov. 12, 2019

(54) SYSTEM OF MEASURING THREE-DIMENSIONAL POSITION

(71) Applicant: Kabushiki Kaisha TOPCON, Tokyo (JP)

(72) Inventors: Nobuyuki Nishita, Tokyo (JP); Kaoru Kumagai, Tokyo (JP)

(73) Assignee: KABUSHIKI KAISHA TOPCON, Tokyo (JP)

( * ) Notice: Subject to any disclaimer, the term of this patent is extended or adjusted under 35 U.S.C. 154(b) by 815 days.

This patent is subject to a terminal disclaimer.

(21) Appl. No.: 15/004,051

(22) Filed: Jan. 22, 2016

(65) Prior Publication Data

US 2017/0167870 A1 Jun. 15, 2017

(30) Foreign Application Priority Data

Jan. 28, 2015 (JP) .................................. 2015-013979
Mar. 5, 2015 (JP) .................................. 2015-043530

(51) Int. Cl.
*G01C 11/04* (2006.01)
*G01C 1/04* (2006.01)
(Continued)

(52) U.S. Cl.
CPC ................ *G01C 11/04* (2013.01); *G01C 1/04* (2013.01); *G01C 3/08* (2013.01); *G01C 15/002* (2013.01); *G06T 7/70* (2017.01); *G06T 7/74* (2017.01); *G06T 2207/10028* (2013.01); *G06T 2207/30204* (2013.01)

(58) Field of Classification Search
CPC .......... G01C 15/002; G01C 1/04; G06T 7/70; G06T 2207/30204
See application file for complete search history.

(56) References Cited

U.S. PATENT DOCUMENTS

2004/0223139 A1* 11/2004 Vogel .................. G01C 15/002
356/141.1
2014/0211999 A1 7/2014 Kwiatkowski

FOREIGN PATENT DOCUMENTS

JP 3735422 B 1/2006
JP 2007206046 A * 8/2007
(Continued)

*Primary Examiner* — Mainul Hasan
(74) *Attorney, Agent, or Firm* — Roberts Mlotkowski Safran Cole & Calderon P.C.

(57) ABSTRACT

The system includes a survey machine having an image-taking section, a section of measuring a distance to a target and a section of measuring an angle, a pointing rod which is positioned on the measurement point X and includes, at a position deviated from a fixed length L from the measurement point, the prism, and an inclination sheet having a mark. The three-dimensional position of the measurement point is measured by equipping the inclination sheet to the pointing rod, imaging a mark surface in the image-taking section, calculating the inclination angle of the inclination sheet with respect to the eye direction from the survey machine by image-analyzing the mark surface, and determining the three-dimensional position of the measurement point from a three-dimensional position of the prism, the inclination angle of the inclination sheet and the fixed length.

7 Claims, 32 Drawing Sheets

(51) Int. Cl.
*G06T 7/70* (2017.01)
*G01C 3/08* (2006.01)
*G01C 15/00* (2006.01)
*G06T 7/73* (2017.01)

(56) References Cited

FOREIGN PATENT DOCUMENTS

| | | | |
|---|---|---|---|
| JP | 2010223754 | A | 10/2010 |
| JP | 2014-527630 | A | 10/2014 |

\* cited by examiner

SYSTEM OF MEASURING THREE-DIMENSIONAL POSITION

TECHNICAL FIELD

The present invention relates to a system of measuring a three-dimensional position of a measurement point, and, especially, to the system measuring the three-dimensional position of the measurement point by using a pointing rod having a prism fixed at a position deviated by a known fixed distance from the measurement point.

BACKGROUND ART

In the field of surveying, measurement, or BIM (Building Information Molding), a three-dimensional position of a measurement point is measured by generally using a surveying machine for measuring a distance and an angle, and a retroreflection prism. In this measurement, the optical reflecting point of the prism cannot be directly placed on the measurement point because the prism has a specified dimension. Accordingly, the prism is usually fixed to a pointing rod (or a pointing stand).

More in detail, after the front end of the pointing rod is placed on the measurement point, and the prism is fixed at the position deviated by a known fixed distance from the measurement point, the three-dimensional position measurement of the prism is performed while the vertical situation of the pointing rod is secured by using a bubbler tube. Then, the three-dimensional position of the measurement point is calculated by moving the measured value toward the downward direction by the above fixed distance. However, this method is not applicable to a measurement in which the pointing rod is inclined such as for a room corner.

On the other hand, another system of measuring a three-dimensional position is proposed in which the measurement can be conducted if the pointing rod is inclined from the measurement point. For example, in Patent Publication 1, after two reflection prisms are fixed and separated from each other by a known distance on a pointing rod, the two points of the prisms are measured for calculating the position of the measurement point from the two three-dimensional positions. In Patent Publication 2, the position of the measurement point is calculated by using values of an incident angle sensor and an inclination sensor possessed by a pointing rod.

PRIOR TECHNICAL PUBLICATIONS

Patent Publications

Patent Publication 1: JP-B-3735422
Patent Publication 2: JP-A-2010-223754

SUMMARY OF INVENTION

Problems to be Solved by Invention

However, in the configuration of Patent Publication 1, the two positions cannot be measured simultaneously so that a restriction exists that the prisms must be motionless during the measurement of the two points. When a far distance is present between the two prisms, the two prisms must be disadvantageously separated. The configuration of Patent Publication 2 requires high cost due to the mounting of a new sensor.

The present invention has been made to overcome these disadvantages, and an object thereof is to provide a system of measuring a three-dimensional position in which an measurement can be performed without any particular restrictions even if a pointing rod is inclined extending from a measurement point.

Means of Solving Problems

The present invention (Claim 1) for achieving the object has the configuration of a system of measuring a three-dimensional position of a measurement point, the system comprising a survey machine including a distance measuring section of measuring a distance to a prism acting as a target, an angle measuring section, and an image-taking section, a pointing rod which is positioned on the measurement point and includes the prism at a position deviated from the measurement point by a known fixed length, and an inclination sheet having a mark which can analyze an inclination angle from an eye direction, wherein the inclination sheet is equipped to the pointing rod, a mark surface having the mark is imaged at the image-taking section, and the inclination angle of the inclination sheet with respect to the eye direction from the survey machine is calculated by image-analyzing the mark surface, and the three-dimensional position of the measurement point is measured from a three-dimensional position of the prism obtained in the distance measuring section and the angle measuring section, the inclination angle of the inclination sheet and the fixed length.

A system of measuring a three-dimensional position of a measurement point in accordance with a certain embodiment includes a survey machine including a distance measuring section of measuring a distance to a prism acting as a target, an angle measuring section, an image-taking section of shooting a surrounding scene of the prism, and a prism image-taking section of shooting the prism, a pointing rod which is positioned on the measurement point and includes the prism at a position deviated from the measurement point by a known fixed length, and an inclination sheet having a mark which can analyze an inclination angle from an eye direction, wherein the inclination sheet is equipped to the pointing rod, a mark surface having the mark is imaged at the image-taking section, and the inclination angle of the inclination sheet with respect to the eye direction from the survey machine is calculated by image-analyzing the mark surface, and the three-dimensional position of the measurement point is measured from a three-dimensional position of the prism obtained in the distance measuring section and the angle measuring section after imaging the prism with the prism image-taking section for collimating the prism, the inclination angle of the inclination sheet and the fixed length.

A system of measuring a three-dimensional position of a measurement point in accordance with a further embodiment includes a survey machine including a distance measuring section of measuring a distance to a prism acting as a target, an angle measuring section, and an image-taking section, a pointing rod which is positioned on the measurement point and includes the prism at a position deviated from the measurement point by a known fixed length, and an inclination sheet having a mark which can analyze an inclination angle from an eye direction, wherein the mark surface having the mark of the inclination sheet is formed on a surface perpendicular to an axial direction of the pointing rod, the mark surface is imaged at the image-taking section, and the inclination angle of the inclination sheet with respect to the eye direction from the survey machine is calculated by image-analyzing the mark surface, and the three-dimensional position of the measurement point is measured by moving positional information from a three-dimensional position of the prism obtained in the distance measuring section and the angle measuring section in a normal direction of the mark surface obtained from the inclination angle of the inclination sheet by the fixed length.

A system of measuring a three-dimensional position of a measurement point in accordance with a still further embodiment includes a survey machine including a distance measuring section of measuring a distance to a prism acting as a target, an angle measuring section, and an image-taking section, a pointing rod which is positioned on the measurement point and includes the prism at a position deviated from the measurement point by a known fixed length, and an inclination sheet having a mark which can analyze an inclination angle from an eye direction, wherein a sheet center of the inclination sheet is formed on a line between the measurement point and a prism center of the prism, a first surface including the sheet center, the prism center and the eye direction from the survey machine is obtained after the mark surface having the mark is imaged in the image-taking section and image-analyzed for obtaining the sheet center, a second surface is calculated having a normal line which is a normal line of the inclination sheet viewed in the eye direction from the survey machine, and an intersectional line between the first surface and the second surface is obtained, and the three-dimensional position of the measurement point is measured by moving positional information from a three-dimensional position of the prism obtained in the distance measuring section and the angle measuring section in a direction along the intersectional line by the fixed length.

A system of measuring a three-dimensional position of a measurement point in accordance with a still further embodiment includes a survey machine including a distance measuring section of measuring a distance to a prism acting as a target, an angle measuring section, and an image-taking section, a pointing rod which is positioned on the measurement point and includes the prism at a position deviated from the measurement point by a known fixed length, and an inclination sheet having a mark which can analyze an inclination angle from an eye direction, wherein at least two mark surfaces having the mark of the inclination sheet and centering around a certain point are formed perpendicular to each other on a surface perpendicular to an axial direction of the pointing rod, the mark surface is imaged at the image-taking section, and the inclination angle of the inclination sheet with respect to the eye direction from the survey machine is calculated by image-analyzing the mark surface, and the three-dimensional position of the measurement point is measured by moving positional information from a three-dimensional position of the prism obtained in the distance measuring section and the angle measuring section in a normal direction of the mark surface obtained from the inclination angle of the inclination sheet by the fixed length.

A system of measuring a three-dimensional position of a measurement point in accordance with a still further embodiment includes a survey machine including a distance measuring section of measuring a distance to a target, an angle measuring section, and an image-taking section, and a pointing rod which is positioned on the measurement point and includes, at a position deviated from a known fixed length from the measurement point, a fixed inclination sheet having a mark which enables analysis of an inclination angle with respect to an eye direction, wherein the mark surface having the mark of the inclination sheet is formed on a surface perpendicular to an axial direction of the pointing rod, the mark surface is imaged at the image-taking section, and the inclination angle of the inclination sheet with respect to the eye direction from the survey machine is calculated by image-analyzing the mark surface, and the three-dimensional position of the measurement point is measured by moving positional information from a three-dimensional position of a sheet center of the inclination sheet obtained in the distance measuring section and the angle measuring section, while using the inclination sheet as the target in a normal direction of the mark surface obtained from the inclination angle of the inclination sheet by the fixed length.

A system of measuring a three-dimensional position of a measurement point in accordance with a still further embodiment includes a survey machine including a distance measuring section of measuring a distance to a target, an angle measuring section, and an image-taking section, and a pointing rod which is positioned on the measurement point and includes, at a position deviated from a known fixed length from the measurement point, a fixed inclination sheet having a mark which enables analysis of an inclination angle with respect to an eye direction, wherein a second mark which enables pattern recognition is formed on a position other than a mark surface having the mark of the inclination sheet such that the measurement point, a sheet center of the inclination sheet and a mark center of the second mark are formed on a same single line, the sheet center and the mark center of the second mark are obtained by imaging and image-analyzing the mark surface and the second mark in the image-taking section, and a first surface including the sheet center and the mark center of the second mark and the eye direction from the survey machine is calculated, a second surface is calculated having a normal line which is a normal line of the inclination sheet viewed in the eye direction from the survey machine, and an intersectional line between the first surface and the second surface is obtained, and the three-dimensional position of the measurement point is measured by moving positional information from a three-dimensional position of a sheet center of the inclination sheet obtained in the distance measuring section and the angle measuring section, while using the inclination sheet as the target, in a direction of the intersectional line by the fixed length.

A system of measuring a three-dimensional position of a measurement point in accordance with a still further embodiment includes a survey machine including a distance measuring section of measuring a distance to a prism acting as a target and being fixed at a position deviated from the measurement position by a known fixed length, an angle measuring section, and an image-taking section, and an inclination sheet having a mark which can analyze an inclination angle with respect to an eye direction, wherein a mark surface having the mark of the inclination sheet is formed on a surface perpendicular to a line between the measurement point and a prism center of the prism, the mark surface is imaged at the image-taking section, and the inclination angle of the inclination sheet with respect to the eye direction from the survey machine is calculated by image-analyzing the mark surface, and the three-dimensional position of the measurement point is measured by moving positional information from a three-dimensional position of the prism obtained in the distance measuring section and the angle measuring section in a normal direction of the mark surface obtained from the inclination angle of the inclination sheet by the fixed length.

A system of measuring a three-dimensional position of a measurement point in accordance with a still further embodiment includes a survey machine including a distance measuring section of measuring a distance to a prism acting as a target and being fixed at a position deviated from the measurement position by a known fixed length, an angle measuring section, and an image-taking section, and an inclination sheet having a mark which can analyze an inclination angle with respect to an eye direction, wherein a sheet center of the inclination sheet is formed on a line between the measurement point and a prism center of the prism, a first surface having a normal line perpendicular to an eye direction from the survey machine is calculated by imaging a mark surface having the mark in the image-taking section for image-analyzing the mark surface, a second surface is calculated having a normal line which is a normal line of the inclination sheet viewed in the eye direction from the survey machine, and an intersectional line between the first surface and the second surface is obtained, and the three-dimensional position of the measurement point is measured by moving positional information from a three-dimensional position of the prism obtained in the distance measuring section and the angle measuring section in a direction along the intersectional line by the fixed length.

Effects of Invention

In accordance with the present invention, the three-dimensional position of the measurement point can be measured by arranging the front end of the pointing rod on the measurement point even when the pointing rod is inclined.

EMBODIMENTS FOR IMPLEMENTING INVENTION

Preferred embodiments in accordance with the present invention will be described referring to the annexed drawings.

First Embodiment (Entire System)

Figure 1:
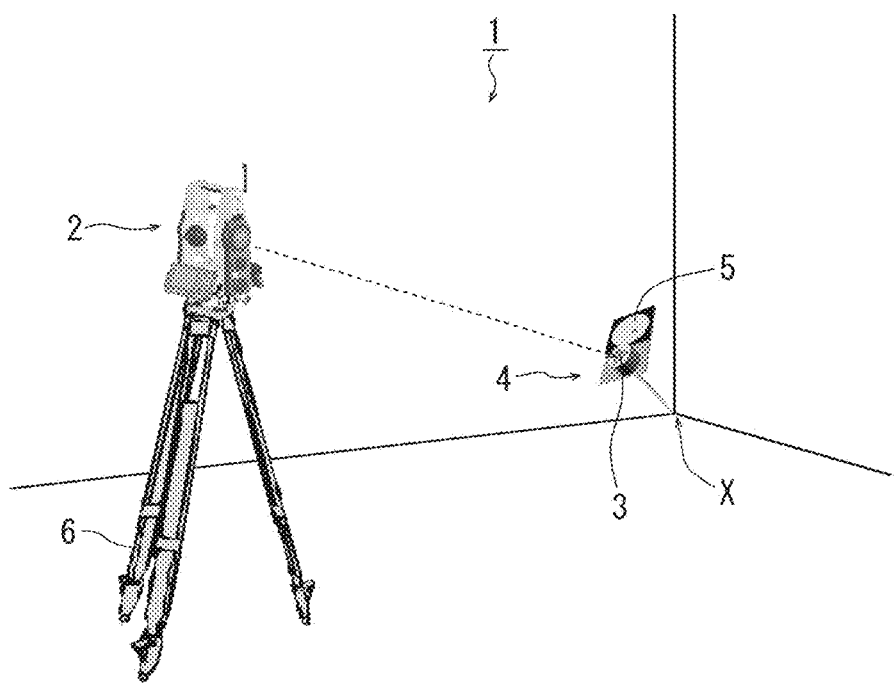
FIG. 1 A perspective view showing an entire configuration of a system for measuring a three-dimensional position in accordance with a first embodiment of the present invention.

FIG. 1 is a perspective view showing an entire configuration of a system for measuring a three-dimensional position in accordance with a first embodiment of the present invention. The system 1 includes a survey machine 2, and a pointing rod 4 having a prism 3 and an inclination sheet 5. The pointing rod 5 is used while its front end is positioned at a measurement point X. The survey machine 2 is installed at a known position by using a tripod 6. An arrow "e" shows an eye direction of the survey machine 2.

(Survey Machine)

Figure 2:
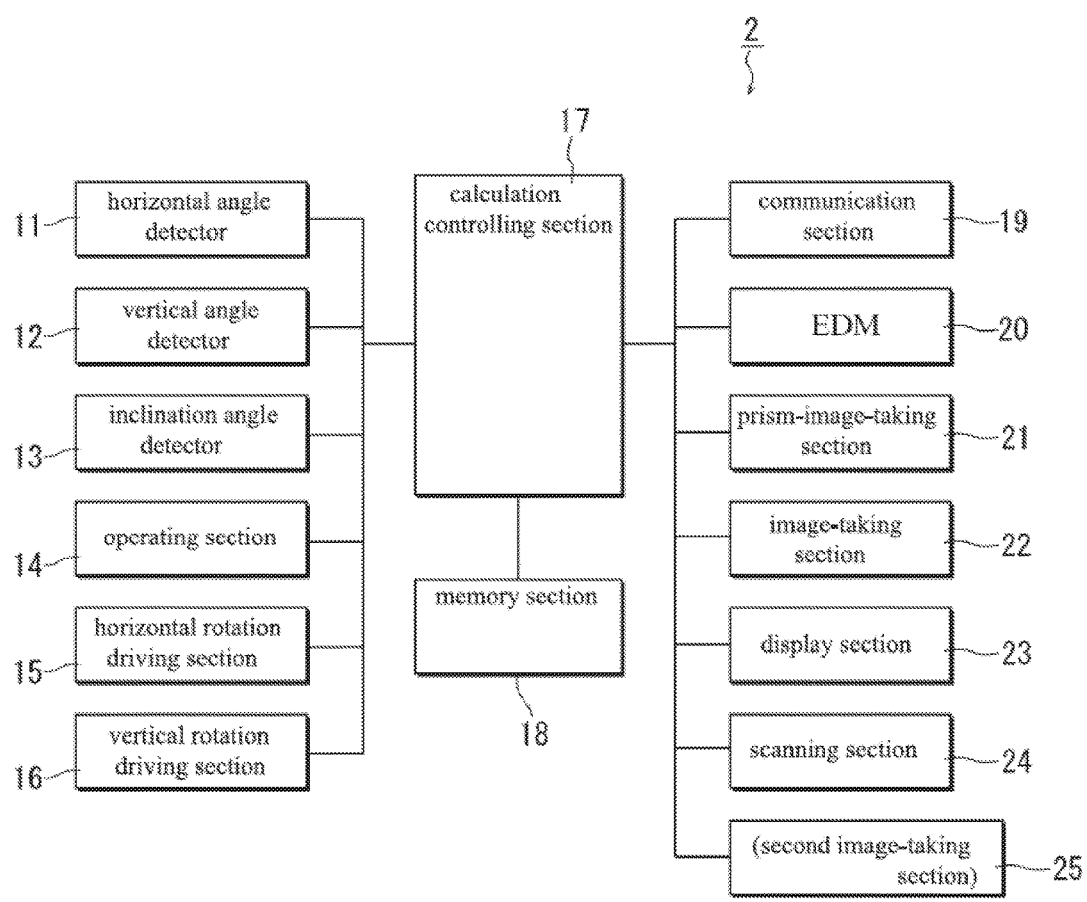
FIG. 2 A block diagram showing an internal configuration of a survey machine.

The survey machine 2 is a motor driven-total station in which the automatic chasing can be conducted. FIG. 2 is a block diagram showing the internal configuration of the survey machine.

The survey machine 2 includes a horizontal angle detector 11, a vertical angle detector 12, an inclination detector 13, an operating section 14, a horizontal rotation driving section 15, a vertical rotation driving section 16, a calculation controlling section 17, a memory section 18, a communication section 19, an electro-optical distance measuring instrument (EDM) 20, a prism image-taking section 21, an image-taking section 22, a display section 23, a scanning section 24 and a second image-taking section 25.

The EDM (electro-optical distance measuring instrument) 20 is a section for measuring a distance to the prism 3 by collimating the prism 3 for outputting distance-measuring light such as infrared laser. The scanning section 24 scans for searching the prism 3 by outputting scanning light such as infrared laser 2 of which a wavelength is different from that of the distance-measuring light. The horizontal rotation driving section 15 and the vertical rotation driving section 16 are motors for rotating the housing accommodating the EDM 20 in the horizontal and vertical directions, respectively. The horizontal angle detector 11 and the vertical angle detector 12 are rotary encoders, which are sections for measuring a horizontal angle and a vertical angle, respectively, of a standard optical axis by obtaining rotation angles in the horizontal direction and the vertical direction of the housing accommodating the EDM 20. The inclination sensor 13 is used to detect the inclination of the EDM 20 for leveling the inclination.

A memory section 18 stores various programs including a program of performing the measurements of the distance and the angle, a program of driving the horizontal and vertical rotation driving sections 15, 16 based on signals input from the operating section 14, a program of controlling communication, a program of conducting the automatic collimation and the automatic chasing of the prism 3, a program of image processing described later, and an operation program of calculating the three-dimensional position of the measurement point X described later. The operating section 14 can perform various operations required for the above programs. The calculation controlling section 17 executes the above programs for performing the various calculations and the various controls. The communication section 19 receives instruction signals from external radio equipment. When the external instructions are received, the calculation controlling section 17 rotates and drives the EDM 20 toward the measurement point, and further starts and stops the automatic chasing. The display section 23 displays various displays and various measurement values.

The prism image-taking section 21 and the image-taking section 22 are image sensors outputting image signals such as CCD and a CMOS sensor, and are configured by aggregates of pixels. The image-taking section 22 shoots an environmental scene of the prism 3 (the scene including the prism 3). The prism image-taking section 21 is equipped with a filter passing only the wavelength of the scanning light, and is configured to appropriately shoot only the prism 3 by receiving the scanning light from the scanning section 24 reflected by the prism 3. A second image-taking section 25 is an arbitrary element and takes an image with a wider field of view than the image-taking section 22. The usage will be described later.

The above configuration is an example of the survey machine 2, and a modification can be made based on the knowledge of a skilled technician.

(Pointing Rod)

Figure 3:
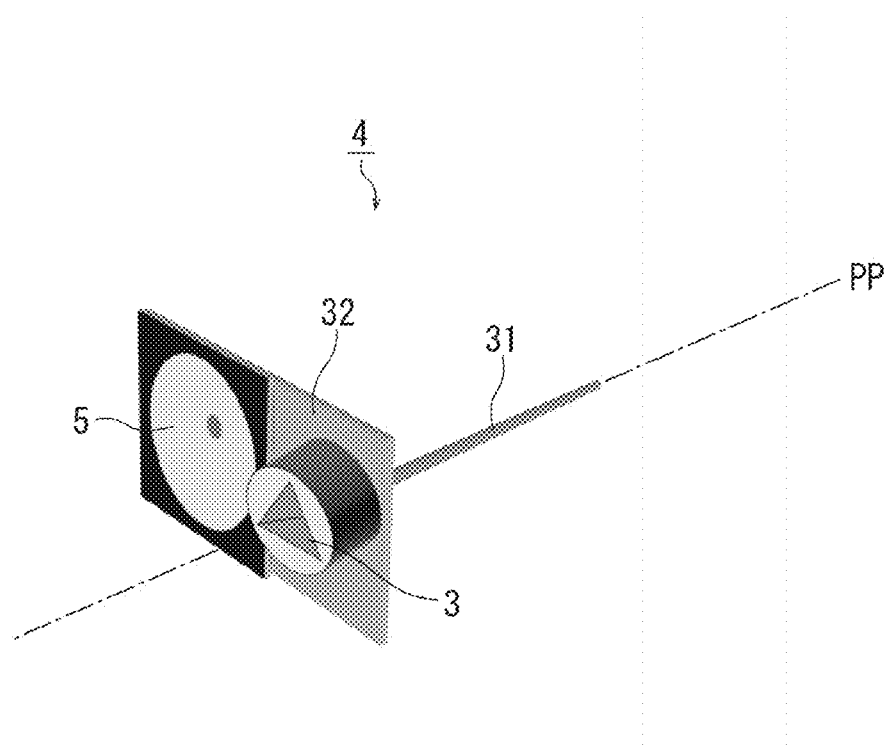
FIG. 3 A right-side perspective view showing a configuration of a pointing rod in accordance with the first embodiment.
Figure 4:
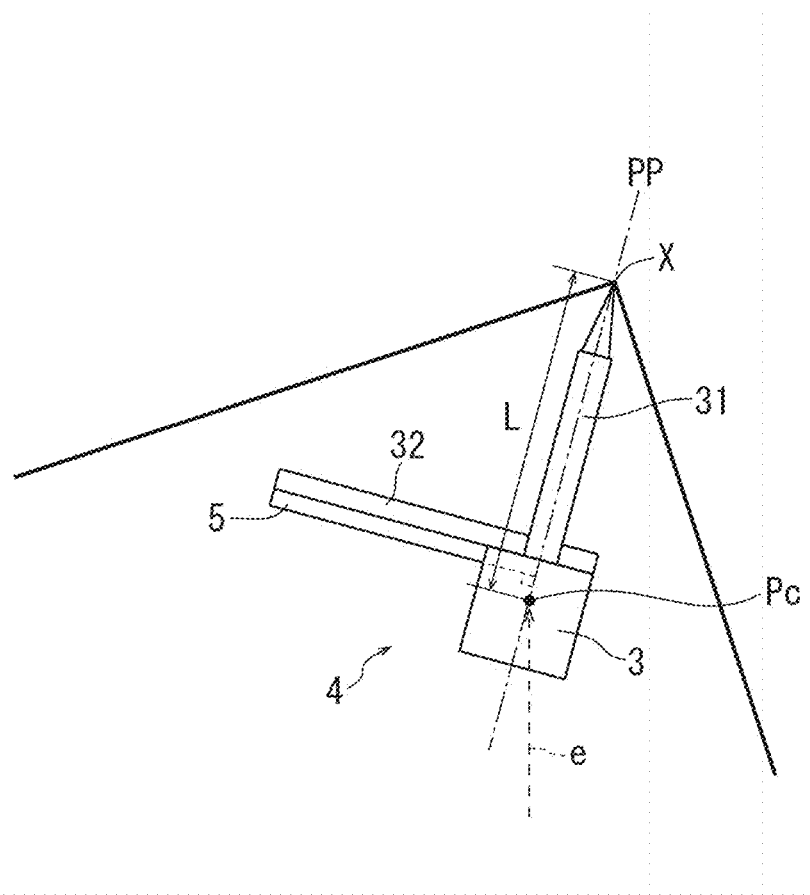
FIG. 4 A plan view showing a measuring state using the pointing rod.

FIG. 3 is a right-side perspective view showing a configuration of the pointing rod in accordance with the embodiment, and FIG. 4 is a plan view showing the measuring state using the pointing rod of FIG. 3. The pointing rod 4 includes a bar-shaped supporting element 31, the prism 3, the inclination sheet 5 and a board 32.

The front end of the supporting element 31 is ferrule-shaped, and is placed on the measurement point X during the measurement. A material of the supporting element 31 is not especially restricted, and that having moderate rigidity and lightweight property such as a metal is preferable. The board 32 is perpendicularly fixed on the other end of the supporting element 31. The board 32 is an example and an arbitrary element and may be replaced with any other element which can fix the prism 3 and the inclination sheet 5 to the supporting element 31 in a manner described later. The board 32 preferably has less influence with respect to the image-taking of the inclination sheet 5 and may be formed by a raw material with a low reflection rate or a material with a high rigidity.

The prism 3 is fixed such that the center of the prism 3 (hereinafter referred to as "prism center Pc") is disposed in the axial direction PP of the pointing rod 4 (supporting element 31) on the front surface of the board 32. The prism center Pc is a floating point in a precise sense. The floating point refers to a virtual point which appears to be immobile when the prism 3 is inclined with respect to the survey machine 2. A length from the prism center Pc to the front end (measurement point X) of the supporting element 31 is fixed as a known distance (this distance will be hereinafter referred to as "fixed length L"). In the present embodiment, any material which can output parallel reflection rays from input rays and can perform the image analysis of the target center can be employed as the prism 3 other than a cube corner prism, and a retroreflection sheet is also usable.

The inclination sheet 5 is fixed at a positioned deviated from the prism 3 by an arbitrary distance on the front surface of the board 32. The prism 3 and the inclination sheet 5 may be fixed by using an appropriate fixing means such as adhesion, screwing, concavo-convex engagement and welding.

(Inclination Sheet)

Figure 5:
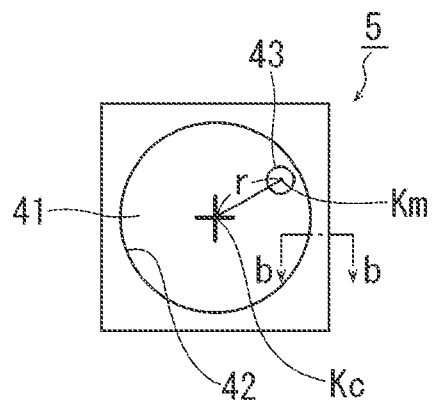
FIG. 5(A) is a plan view of the inclination sheet.
FIG. 5(B) is a partial sectional view of the inclination sheet.
FIG. 5(C) is a partial plan view of a plano-convex lens sheet.
FIG. 5(D) is a partial plan view of an image-forming layer.
Figure 5B:
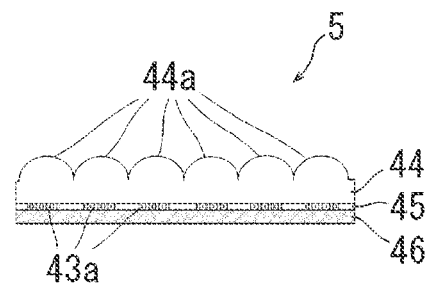
Figure 5C:
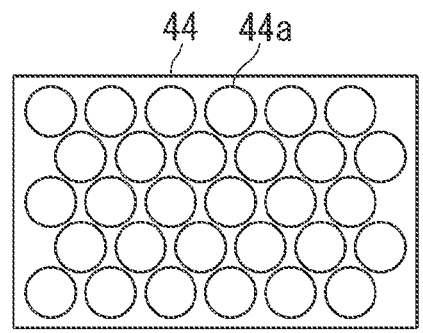
Figure 5D:
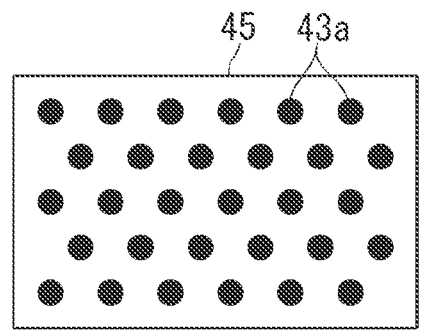

FIG. 5(A) is a plan view of the inclination sheet 5, FIG. 5(B) is a partial sectional view of the inclination sheet 5 (a sectional view along a line b-b of FIG. 5(B), FIG. 5(C) is a partial plan view of a plano-convex lens sheet 44, and FIG. 5(D) is a partial plan view of an image-forming layer 45. In FIG. 5(A), an outline 42 is filled in white.

As shown in FIG. 5(A), the inclination sheet 5 includes a mark surface 41 on which a mark 43 for analysis appears, and the outline 42 of the mark surface 41. As shown in FIG. 5(B), the inclination sheet 5 includes the plano-convex lens sheet 44, the image-forming layer 45 and an image-forming medium 46. As shown in 5(C), the plano-convex lens sheet 44 is formed by a plurality of plano-convex lenses 44a arranged in a honeycomb array or a square array. As shown in FIG. 5(D), image marks 43a are formed with ink-printing on the image-forming layer 45 in a nearly one-to-one correspondence manner with respect to the plano-convex lens 44a. The image-forming layer 45 and the image-forming medium 46 are translucent and are stacked by means of adhesion on a surface of the plano-convex lens sheet 44 while keeping the translucency.

While the outline 42 of the present embodiment is a precise circle, the outline 42 may be any shape provided that a center Kc of the mark sheet (center of mark surface 41) of the inclination sheet 5 can be obtained by means of the image analysis. The image mark 43a may be also any shape provided that a mark center Km can be obtained by means of the image analysis.

When the inclination sheet 5 is viewed from the mark surface 41, a virtual image of the image mark 43a (that is, the mark 43 shown in FIG. 5(A)) is seen to move, depending a moving eye direction, along the same direction as the moving eye direction, or to move along the opposite direction of the moving eye direction. While the moving direction of the mark 43 is determined by the size difference between the lens pitch and the image mark, no importance is attached to which of the lens pitch and the image mark is larger because it is sufficient that the mark 43 regularly moves depending on the moving eye direction.

The position of the mark 43 with respect to the outline 42 changes depending on the inclination angle with the eye direction in the inclination sheet 5 so that the change of the inclination angle with the eye direction can be related with a mark radius "r" from the sheet center Kc to the mark center Km by using a function. Accordingly, the inclination angle of the inclination sheet 5 with respect to the eye direction can be analyzed by imaging the mark surface followed by its image analysis. One example of the function appears in JP-A-2014-102246.

As described above, the inclination sheet 5 is fixed such that the mark surface 41 is positioned on the surface perpendicular to the axial direction PP of the pointing rod 4 in the present embodiment. Thereby, the three-dimensional position of the measurement position X can be measured by using the following method.

(Measurement Method)

Figure 6A:
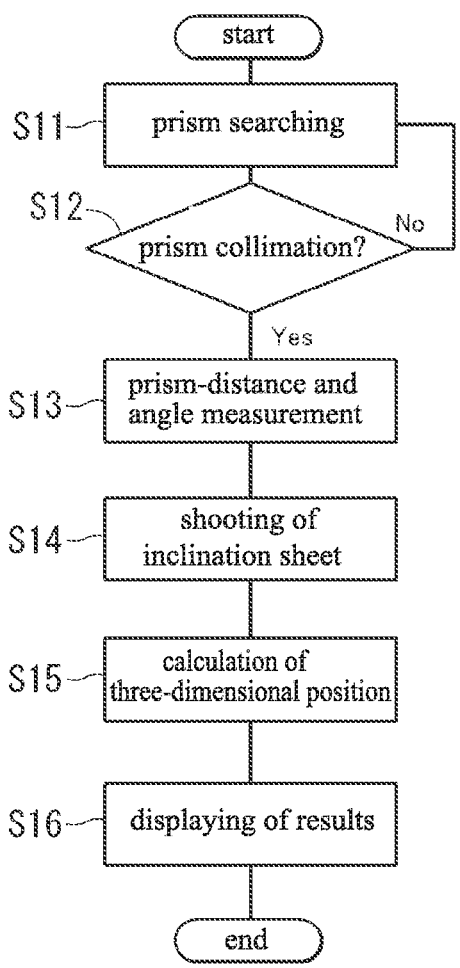
FIG. 6(A) is a basic flow chart of the system for measuring the three-dimensional position.

The summary of the measurement will be described. FIG. 6(A) is the basic flow chart of measurement in the system 1 for measuring the three-dimensional position, and FIG. 6(B) is its flow chart when an automatic chasing is conducted.

As shown in FIG. 6(A), the prism 3 is basically scanned for searching in a scanning section 24 at a step S11. Then, whether the automatic collimation of the prism 3 is performed or not is judged based on the image in which only the prism 3 is imaged by using the prism image-taking section 21 at a step S12. When the automatic collimation is not performed, the processing returns to the step S11. When the automatic collimation is performed, the processing is shifted to a step S13, and the distance and the angle to the prism 3 are measured for determining the three-dimensional position of the prism 3. Then, the processing is shifted to a step S14 for shooting the inclination casing 5 by using the image-taking section 22. The step S13 and the step S14 may be implemented simultaneously. Then, the processing is shifted to a step S15 for calculating the three-dimensional position of the measurement point X based on the three-dimensional position of the prism 3, the inclination angle of the inclination sheet 5 and the fixed length L of the prism 3. Then, the processing is shifted to a step S16 for displaying the measurement point X on the display section 23, and the processing is ended.

Figure 6B:
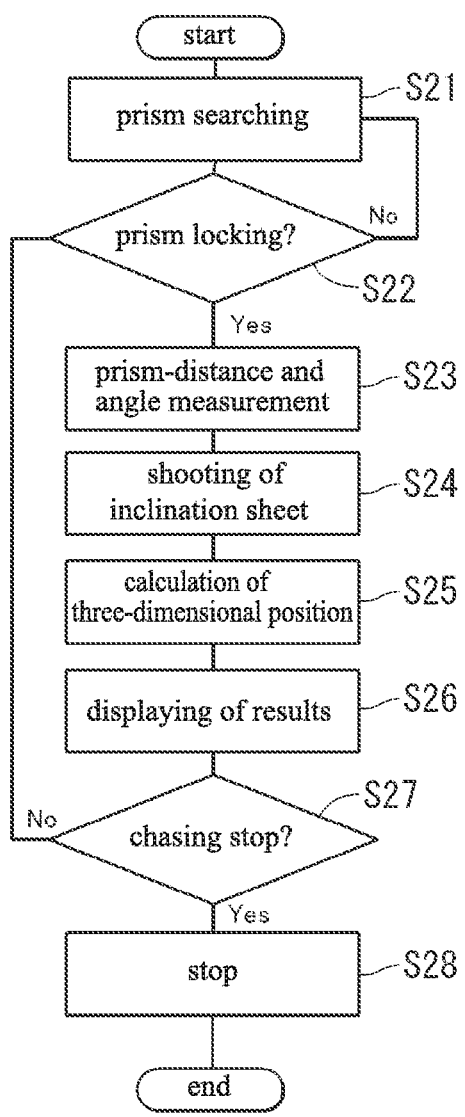
FIG. 6(B) is a flow chart when an automatic chasing is conducted.

For conducting the automatic chasing, as shown in FIG. 6(B), the prism 3 is scanned for searching at a step S21, and whether the prism 3 is locked (automatically collimated) or not is judged based on the image in which only the prism 3 is shot by using the prism image-taking section 21 at a step S22. Subsequent steps S 23 to S25 are similar to the steps S13 to S16. When the stop of the automatic chasing is ordered at a step S27, the processing advances to a step S28 for stopping the chasing. In absence of the stop order, the processing returns to the step S22 for continuing the chasing.

(Calculation Method of Three-Dimensional Position)

Figure 7:
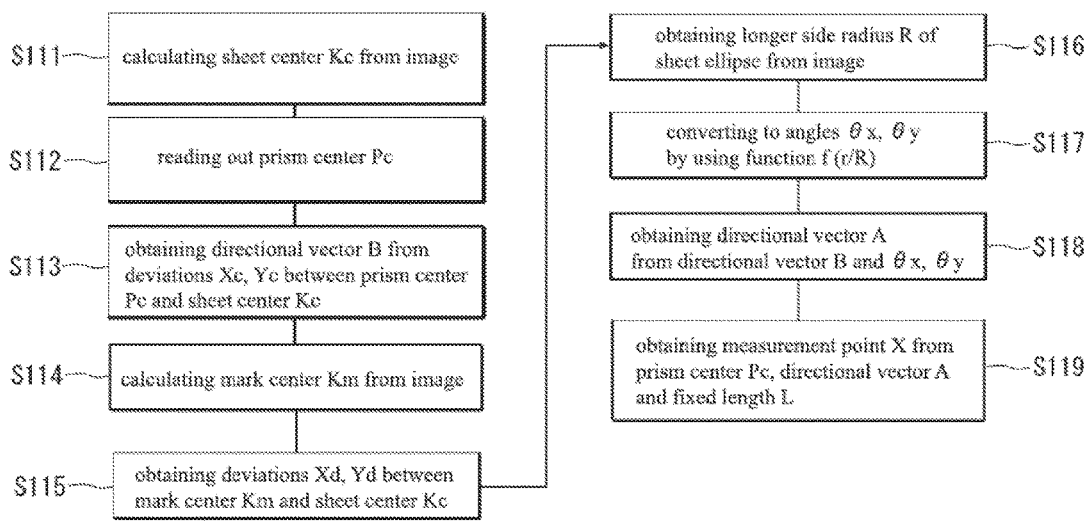
FIG. 7 A flow chart for calculating the three-dimensional position in accordance with the first embodiment.
Figure 8:
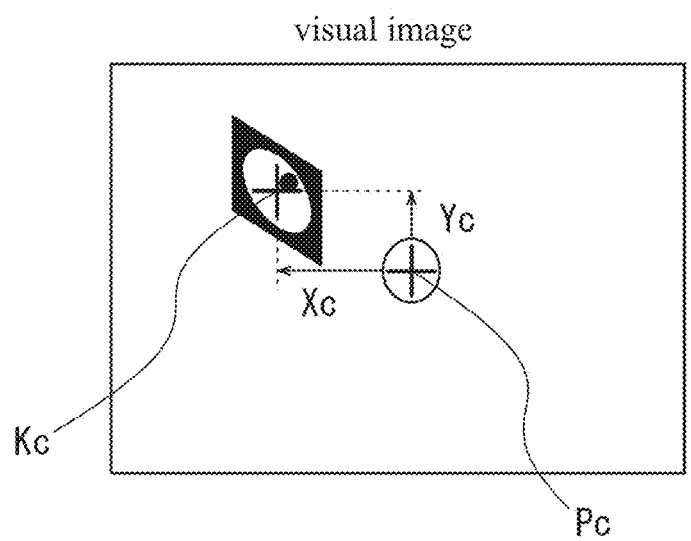
FIG. 8 An example of a visual image.
Figure 9:
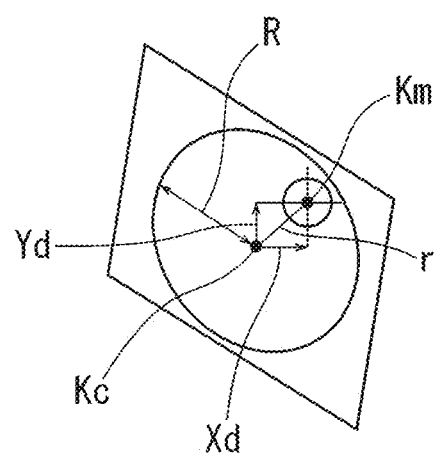
FIG. 9 An example of a visual image.
Figure 10:
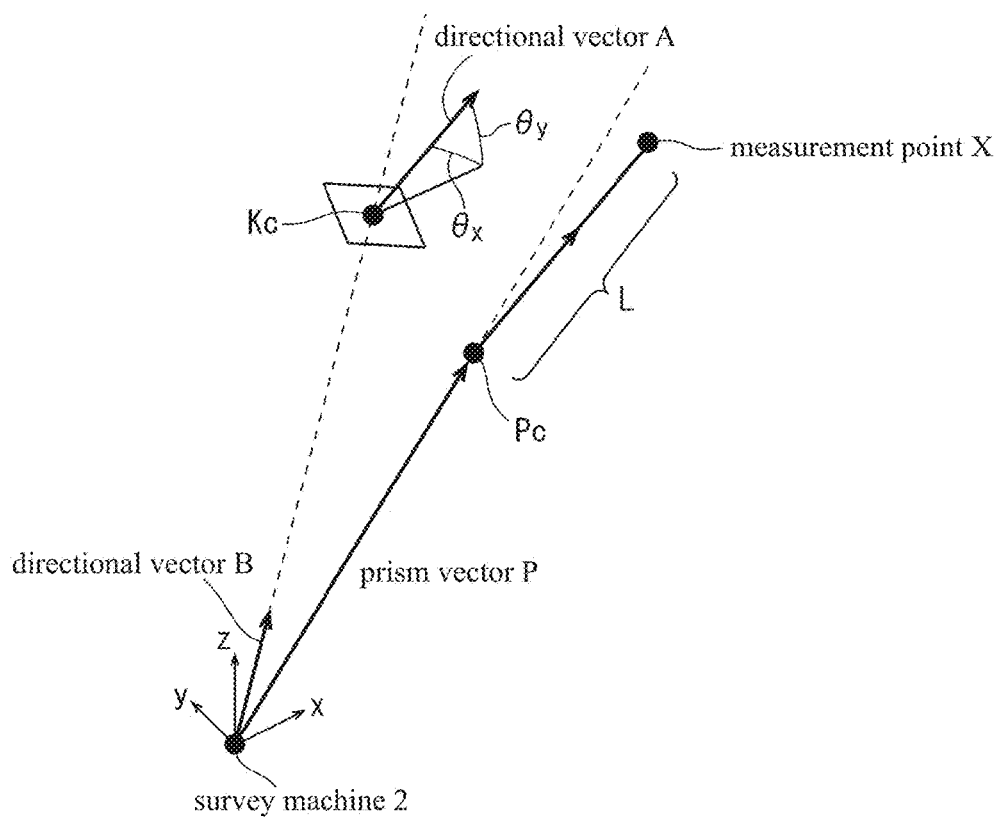
FIG. 10 A conceptional drawing of a measurement method of the first embodiment.

A method of calculating the three-dimensional position of the measurement point X at the step S15 or the step S25 of FIG. 6(B) in the first embodiment will be described. FIG. 7 is a flow chart for calculating the three-dimensional position. FIGS. 8 to 10 are drawings for supplementing the description of the flow chart of FIG. 7, FIGS. 8 and 9 illustrate examples of visual images, and FIG. 10 is a conceptional drawing of the measurement method. An outline 42 is filled in white for description in FIG. 9.

At first, at a step S111, the pattern center Kc of the inclination sheet 5 is image-analyzed by using a visual image shot at the image-taking section 22 (refer to FIG. 8).

Then, the value of the measured distance of the prism 3 obtained at the EDM 20 and the value of the measured angle of the prism 3 obtained at the horizontal angle detector 11 and the vertical angle detector 12 are read out from the memory section 18 at a step 112.

Then, at a step S113, a horizontal direction-deviation value Xc and a vertical direction-deviation value Yc between the positions of the prism center Pc and the sheet center Kc on the image is determined (refer to FIG. 8). The positional direction (directional vector B) of the inclination sheet 5 is determined from the deviation values Xc and Yc (refer to FIG. 10). The directional vector has only information of direction without dimension.

Then, at a step 114, the mark center Km of the mark 43 is image-analyzed by using the visual image shot at the image-taking section 22 (refer to FIG. 9).

Then, at a step 115, a horizontal direction-deviation value Xd and a vertical direction-deviation value Yd between positions of a mark center Km and the sheet center Kc on the image are obtained, and the mark radius "r" from the sheet center Kc to the mark center Km is obtained (refer to FIG. 9).

Then, at a step 116, a longer side radius R of the mark surface 41 is image-analyzed (refer to FIG. 9).

Then, at a step S117, a horizontal direction-inclination angle $\theta x$ and a vertical direction-inclination angle $\theta y$ of the inclination sheet 5 viewed from the eye direction "e" of the survey machine 2 are obtained by using a function of "$f(r/R)=\theta$" (refer to FIG. 10).

Then, at a step S118, a normal line direction of the inclination sheet 5 viewed from the eye direction of the survey machine 2 (directional vector A) is obtained from the directional vector B, and the inclination angles $\theta x$ and $\theta y$ (refer to FIG. 10).

Then, at a step S119, the three-dimensional position of the measurement point X is obtained by moving the positional information from the three-dimensional position of the prism center Pc obtained by the measured values of the angle and the distance of the prism 3 in the direction of the directional vector A by the fixed length L.

(Effects)

As described, in the first embodiment, the three-dimensional position of the measurement point X can be obtained from the three-dimensional position of the prism 3 (the measured values of the angle and the distance of the prism center Pc), the inclination angle obtained from the inclination sheet 5 (the inclination angles $\theta x$ and $\theta y$ of the mark surface 41), and the fixed length L of the prism 3.

In the three-dimensional position measurement system of the first embodiment, the mark surface 41 of the inclination sheet 5 is formed on the surface perpendicular to the axial direction PP of the pointing rod 4 so that the normal direction of the mark surface 41 (directional vector A) obtained by the analysis of the inclination sheet 5 is coincident with the axial direction PP of the pointing rod 4. For this reason, the measurement point X can be measured by moving the positional information from the prism vector P at the prism center Pc by the fixed length L in the direction of the directional vector A (refer to FIG. 10).

The steps S11 to S13 or the steps S21 to S23 of the present embodiment can be performed when the collimation is conducted by using the image obtained in the image-taking section 22. In this case, the collimation can be performed by using an image shot with illumination rays of a continuous spectrum, and not by a specified wavelength of the scanning section 24. In this case, the collimation can be performed by using an image taken with illumination rays of a continuous spectrum, and not by a specified wavelength of the scanning section 24.

However, the collimation is conducted by using the image in which only the prism 3 is shot and is obtained at the scanning section 24 and the prism image-taking section 21 at the steps S11 to S13 or the steps S21 to S23 after the prism image-taking section 21 is installed separated from the image-taking section 22. Thereby, the automatic collimation can be conducted more definitely and the position of the prism 3 can be analyzed more precisely so that the three-dimensional position of the prism center Pc in the above step S119 can be preferably obtained with higher accuracy.

A worker can measure the three-dimensional position of the measurement point X without adjustment such as leveling of the prism 3 even if the pointing rod 4 is inclined only by contacting the front end of the pointing rod 4 at the measurement point X in accordance with the first embodiment so that the operation efficiency is elevated. As shown in FIG. 6(B), the combination with the automatic chasing enables the successive measurements only by contacting the pointing rods 4 to the points one after another which are to be measured because the measured values of the distance and the angle of the prism and the inclination angle are calculated on a real-time basis for renewing the position of the measurement point X so as to further elevate the operation efficiency.

No further sensor is required for measuring the inclination of the pointing rod 4 so that the inexpensive operation can be achieved. The higher accuracy can be obtained than the use of a sensor value because the measurement point X is calculated from the analysis value of the inclination sheet 5 based on the prism position which can be obtained with higher accuracy. The thin and compact inclination sheet 5 does not lower the workability.

Alternative Example

Followings are alternative examples of the first embodiment.

Figure 11:
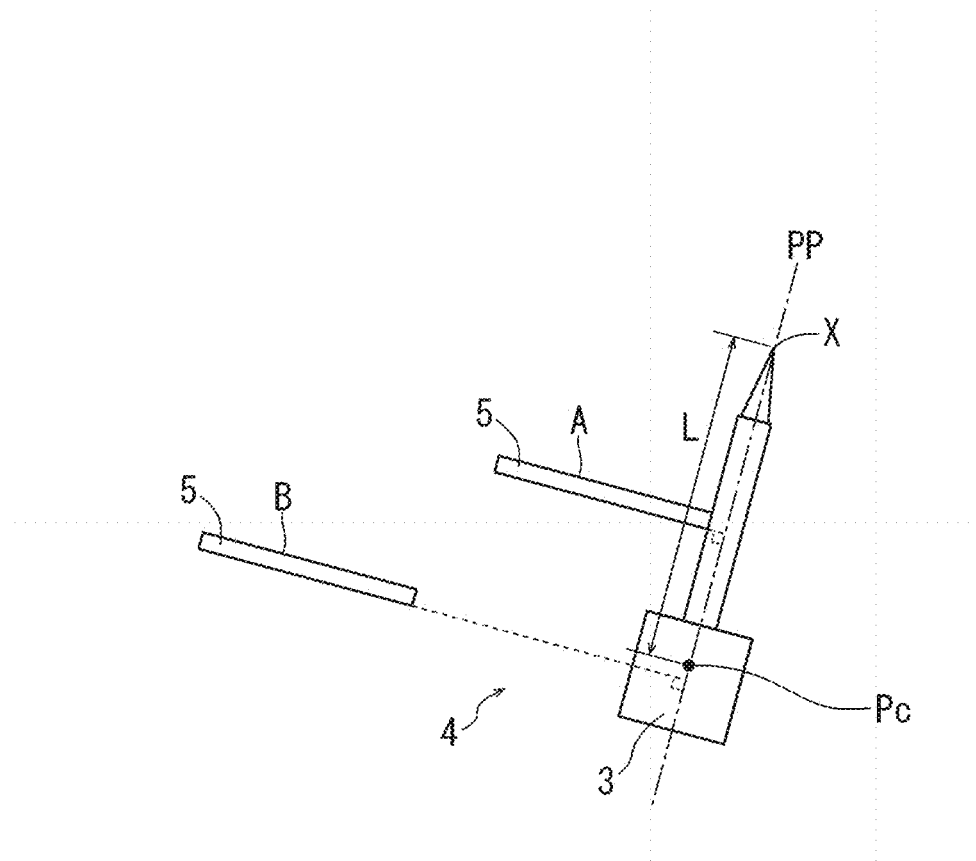
FIG. 11 An alternative example of the first embodiment.

FIG. 11 illustrates an alternative example of the first embodiment regarding the arrangement of the inclination sheet 5. The position of the inclination sheet 5 is arbitrary as along as the mark surface 41 is disposed on the surface perpendicular to the axial direction PP of the pointing rod 4. For example, the inclination sheet 5 may be disposed around the pointing rod 4 as specified by a symbol A or separated from the pointing rod 4 as specified by a symbol B.

Figure 12:
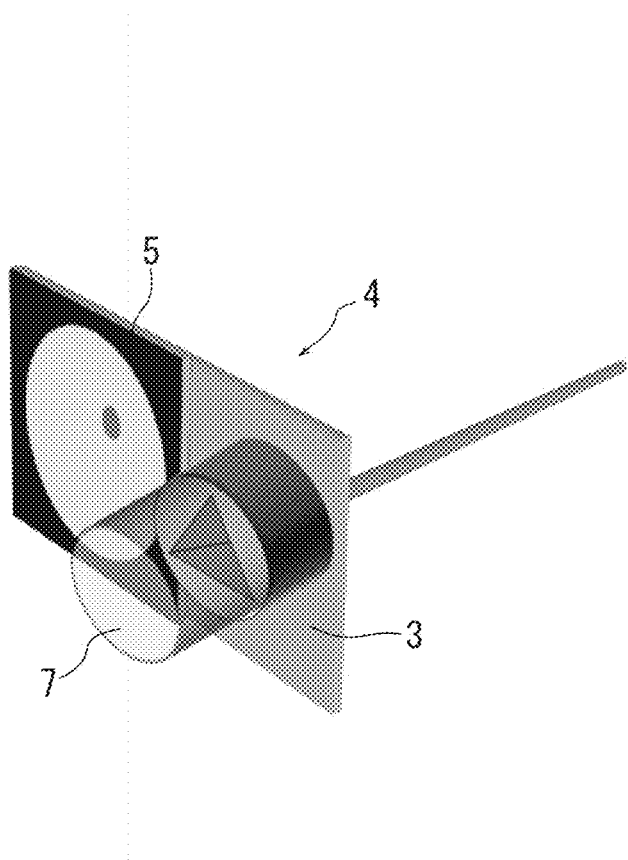
FIG. 12 An alternative example of the first embodiment.

FIG. 12 illustrates an alternative example in which a hood 7 is attached to the prism 3. When the inclination angle from the eye direction is larger, the repetition of the moiré pattern of the mark 43 is characteristically seen on the inclination sheet 5 to introduce a possible measurement error. Accordingly, the hood 7 is preferably disposed around the prism 3. In this manner, when the inclination angle from the eye direction exceeds that in which a primary pattern or more of the mark 43 is seen, the prism 3 cannot be collimated due to the hood so that the measurement is stopped because the step S12 or S22 and the subsequent steps are not operated. The hood 7 is made of resin having a light blocking effect, for example, and has a shape covering at least semiperimeter of the prism 3. The length of the hood 7 is appropriately determined in consideration of the position where the primary pattern or more of the mark 43 cannot be seen. When this alternative embodiment is employed, the inclination sheet 5 is preferably disposed at the front end position of the hood 7 after the hood 7 is shifted to the front end such that the hood 7 does not cast its shadow on the mark surface 41. The above effects can be produced in the measurement from any of the all directions of 360 degree when the hood 7 covers all the circumference of the prism 3.

Figure 13:
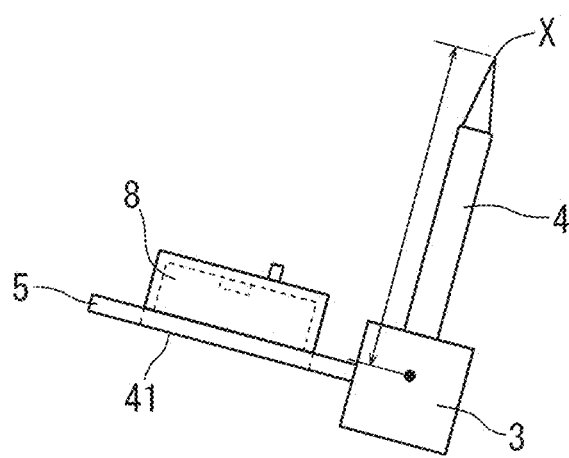
FIG. 13 An alternative example of the first embodiment.

FIG. 13 shows an alternative example in which an illumination device 8 is equipped on the rear surface of the inclination sheet 5. The illumination device 8 may include any configuration, and is configured to irradiate light, at least, on the whole effective region of the inclination sheet 5 (mark surface 41). For example, an LED chip and an electronic substrate are accommodated in a housing having a front opening corresponding to an area of the mark surface 41, as shown in FIG. 13, such that the device 8 may be turned ON and OFF by means of an external switch depending on necessity. The illumination device 8 equipped on the rear surface of the inclination sheet 5 enables the shooting of the mark surface 41 even at a dark place so that it is advantageous for the night-time measurement.

Second Embodiment (Entire System)

The configuration of the pointing rod 4 in the second embodiment is different from that of the first embodiment. With this change, a calculation method of a three-dimensional position is also different from that of the first embodiment.

Also the three-dimensional position measurement system of the second embodiment includes a survey machine 2, and a pointing rod 4 having a prism 3 and an inclination sheet 5. The pointing rod 4 is similarly used while its front end is positioned at a measurement point X.

The description of the internal configuration of the survey machine 2 is omitted because the configuration is similar to that of the first embodiment.

(Pointing Rod)

Figure 14:
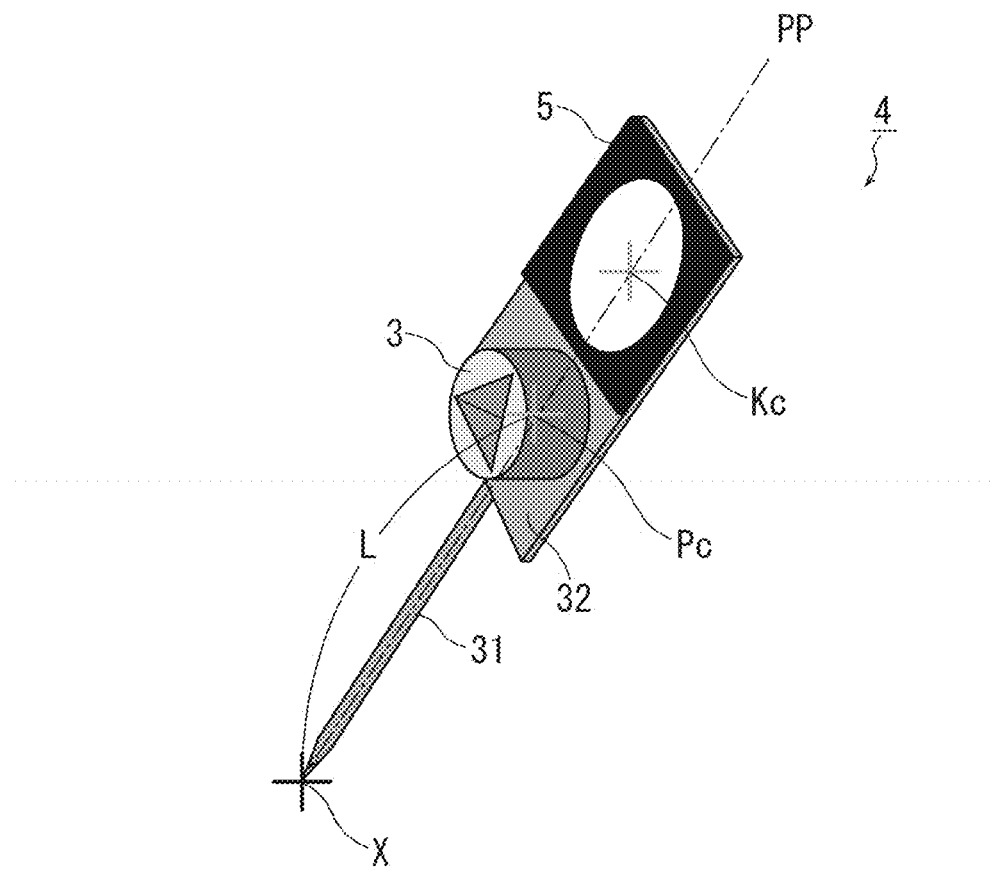
FIG. 14 A right-side perspective view showing a configuration of a pointing rod in accordance with a second embodiment.

FIG. 14 is a right-side perspective view showing a configuration of the pointing rod 4 in accordance with the second embodiment. The pointing rod 4 includes a bar-shaped supporting element 31, the prism 3, the inclination sheet 5 and a board 32.

The description of the supporting element 31 is omitted because the element is similar to that of the first embodiment. The board 32 is fixed at the other end of the supporting element 31 parallel to the supporting element 31. The configuration of the board 32 is not described because the board 32 is similar to that of the first embodiment.

The prism 3 is fixed on the front surface of the board 32 such that the prism center Pc (floating point) is disposed on the axial direction PP of the pointing rod 4 (supporting element 31). A length from the prism center Pc to the front end (measurement point X) of the supporting element 31 is fixed as a known length L. In the present embodiment, any material which can output parallel reflection rays from input rays and can perform the image analysis of the target center can be employed as the prism 3 other than a cube corner prism, and a retroreflection sheet is also usable.

The inclination sheet 5 is fixed such that the sheet center Kc of the inclination sheet 5 is disposed in the axial direction PP of the pointing rod 4 on the front surface of the board 32. Also in the present embodiment, the prism 3 and the inclination sheet 5 may be fixed by using an appropriate fixing means such as adhesion, screwing, concavo-convex engagement and welding.

(Inclination Sheet)

The description of the inclination sheet 5 is omitted because the element is similar to that of the first embodiment.

As described above, the inclination sheet 5 is fixed such that the sheet center Kc of the inclination sheet 5 is disposed on the line between the measurement point X and the prism center Pc in the present embodiment. In this arrangement, the three-dimensional position of the measurement point X can be measured by using the following method.

(Measurement Method)

The description of the summary of the measurement is omitted because the measurement is similar to that in the measurement flow chart of the three-dimensional position measurement system shown in FIG. 6(A).

(Measurement Method of Three-Dimensional Position)

Figure 15:
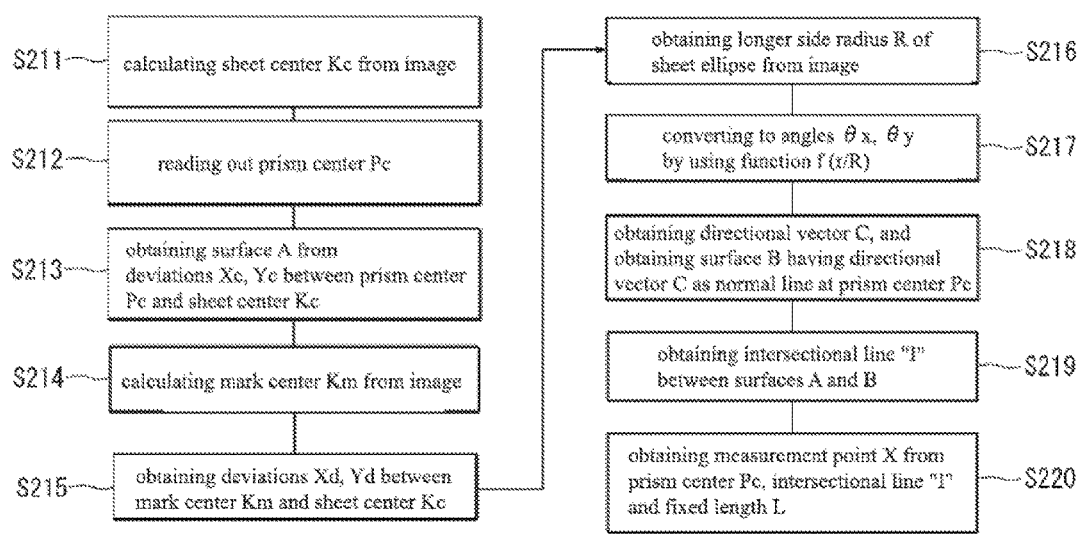
FIG. 15 A flow chart for calculating a three-dimensional position in accordance with the second embodiment.

The method of measuring the three-dimensional position of the measurement position X in the S15 or the step S25 of FIG. 6(B) in the second embodiment will be described. FIG. 15 is a flow chart for calculating the three-dimensional position in accordance with the second embodiment, and FIG. 16 is a conceptional drawing of the measurement method of the second embodiment for supplementing the description of the flow chart of FIG. 15.

The description of the steps S211 to S212 shown in FIG. 5 is omitted because these steps are is similar to the steps S111 to S112 of the first embodiment.

Figure 16:
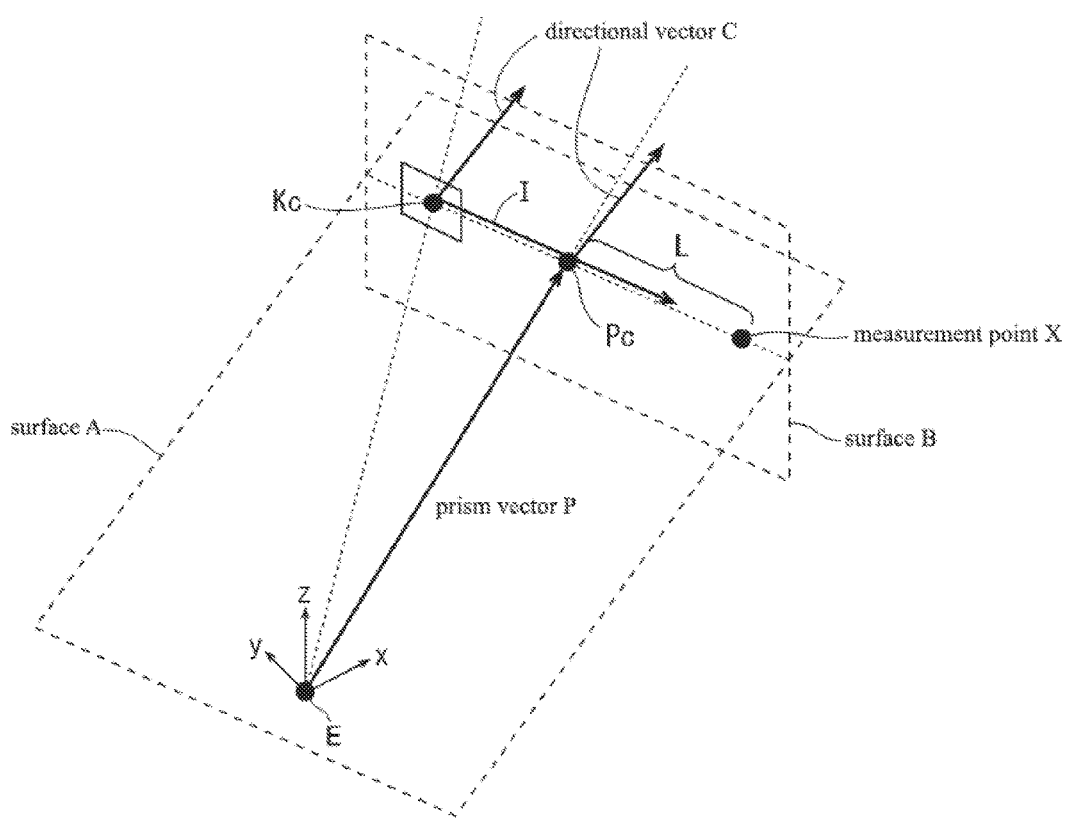
FIG. 16 A conceptional drawing of a measurement method of the second embodiment.

Then, at a step 213, a horizontal direction-deviation value Xc and a vertical direction-deviation value Yc between positions of the prism center Pc and the sheet center Kc on the image are obtained (refer to FIG. 8), and a surface A (first surface) including three points, that is, the prism center Pc, the sheet center Kc, and an observing point E of the survey machine 2 (refer to FIG. 16).

The description of the steps 214 to S217 is omitted because these steps are is similar to the steps S114 to S117 of the first embodiment.

Then, at a step 218, the normal direction (directional vector C) of the inclination sheet 5 viewed from the eye direction of the survey machine 2 from the inclination angles θx and θy obtained at the step S217 is obtained (refer to FIG. 16), and a surface B (second surface) having a directional vector C as its normal line is obtained (refer to FIG. 16).

Then, at a step 219, an intersection "I" between the surface A and the surface B is obtained.

Then, at a step 220, the three-dimensional position of the measurement point X is obtained by moving the positional information from the three-dimensional position of the prism center Pc by the fixed length L along the intersection "I".

(Effects)

As described, in the second embodiment, the three-dimensional position of the measurement point X can be obtained from the three-dimensional position of the prism 3 (the measured values of the angle and the distance of the prism center Pc), the inclination angle obtained from the inclination sheet 5 (the inclination angles θx and θy of the mark surface 41), and the fixed length L of the prism 3.

In the three-dimensional position measurement system 1 of the second embodiment, since the sheet center Kc of the inclination center 5 is positioned on the line between the positions of the measurement point X and prism center Pc or since the inclination sheet 5 is disposed parallel to the axial direction PP of the pointing rod 4 so that the sheet center Kc, the prism center Pc and the measurement point X are positioned collinearly, the intersectional line "I" between the surface A (first surface of which a normal line is perpendicular to the eye direction from the survey machine 2) and the surface B (surface having the normal line (directional vector C of the mark surface 41 of the inclination sheet 5 viewed in the eye direction from the survey machine 2) is coincide with the axial direction PP of the pointing rod 4. Accordingly, the measurement X can be measured by moving the positional information from the prism vector P at the prism center Pc by the fixed length L in the direction along the intersectional line "I" opposite to that in which the inclination sheet 5 exists (refer to FIG. 17).

A worker can measure the three-dimensional position of the measurement point X without adjustment such as leveling of the prism 3 even if the pointing rod 4 is inclined only by contacting the front end of the pointing rod 4 at the measurement point X in accordance with the second embodiment so that the operation efficiency is elevated. As shown in FIG. 6(b), the combination with the automatic chasing enables the successive measurements only by contacting the pointing rods 4 to the points one after another which are to be measured because the measured values of the distance and the angle of the prism and the inclination angle are calculated on a real-time basis for renewing the position of the measurement point X so as to further elevate the operation efficiency.

No further sensor is required for measuring the inclination of the pointing rod 4 so that the inexpensive operation can be achieved. The higher accuracy can be obtained than the use of a sensor value because the measurement point X is calculated from the analysis value of the inclination sheet 5 based on the prism position which can be obtained with higher accuracy. The thin and compact inclination sheet 5 does not lower the workability.

Alternative Example

Following is an alternative example of the second embodiment.

The position of the inclination sheet 5 is arbitrary as along as the sheet center Kc of the inclination sheet 5 is disposed on the line between the measurement point X and the prism center Pc. The arrangement of the prism 3 and the inclination sheet 5 shown in FIG. 14 may be reversed in the vertical direction, for example. In this case, the movement of the fixed length L is simply performed in the opposite direction. The positional information is moved from the three-dimensional position of the prism 3 onto the intersectional line "I" so that the prism 3 and the inclination sheet 5 may be separated from each other by an arbitrary distance.

Figure 17:
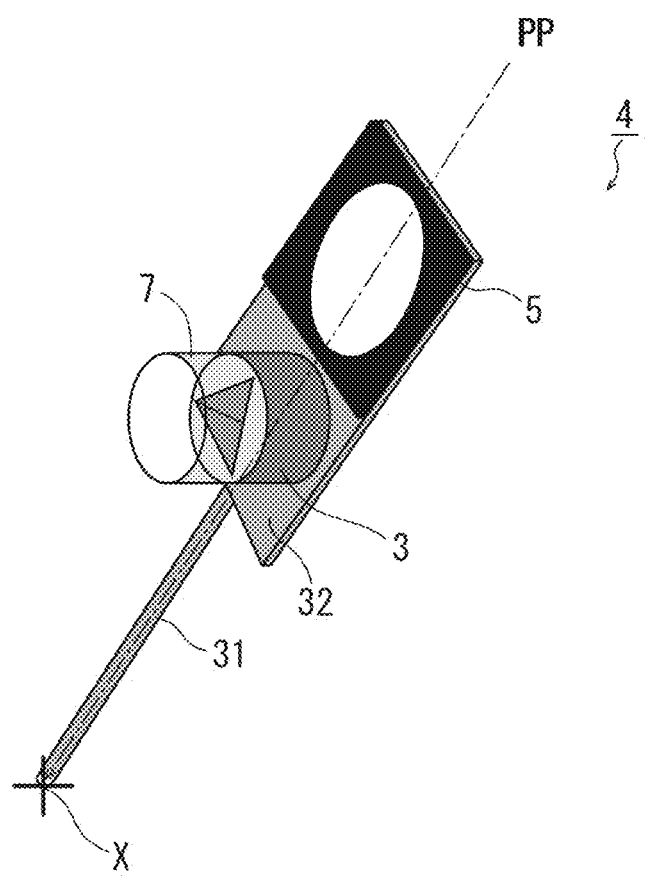
FIG. 17 An alternative example of the second embodiment.

FIG. 17 illustrates an alternative example in which the hood 7 is equipped on the prism 3 in the second embodiment. The configuration of the hood 7 and the effects produced thereby are similar to those of the first embodiment.

Figure 18:
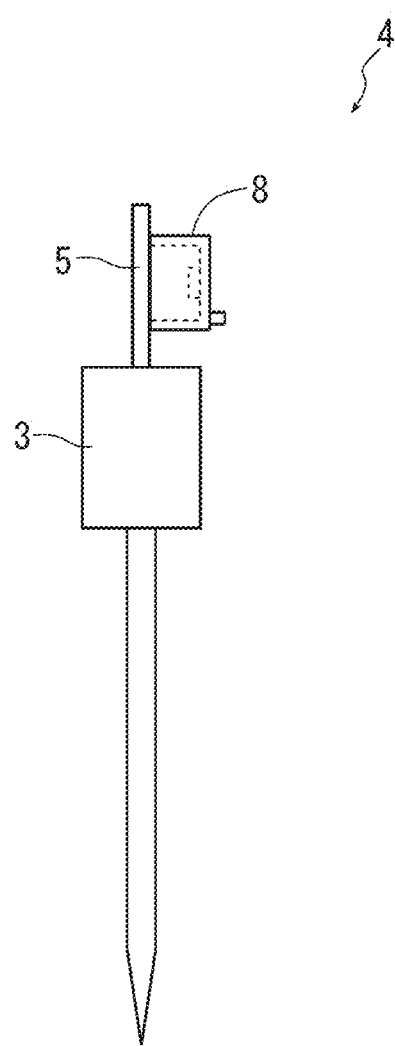
FIG. 18 An alternative example of the second embodiment.

FIG. 18 illustrates an alternative example in which the illumination device 8 is equipped on the rear surface of the inclination sheet 5. The configuration of the illumination device 8 and the effects produced thereby are similar to those of the first embodiment.

Third Embodiment (Entire System)

The configurations of the pointing rod 4 and the inclination sheet 5 in the third embodiment are different from those of the first and the second embodiments. With these changes, a calculation method of a three-dimensional position is also different from those of the first and second embodiments.

Also the three-dimensional position measurement system of the third embodiment includes a survey machine 2, and a pointing rod 4 having a prism 3 and an inclination sheet 5. The pointing rod 4 is similarly used while its front end is positioned at a measurement point X.

The description of the internal configuration of the survey machine 2 is omitted because the configuration is similar to that of the first embodiment.

(Pointing Rod)

Figure 19:
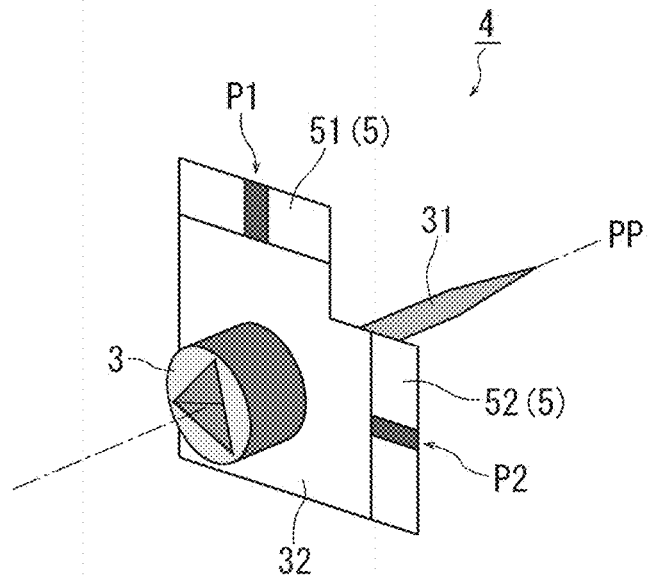
FIG. 19 A right-side perspective view showing a configuration of a pointing rod in accordance with a third embodiment.
Figure 20:
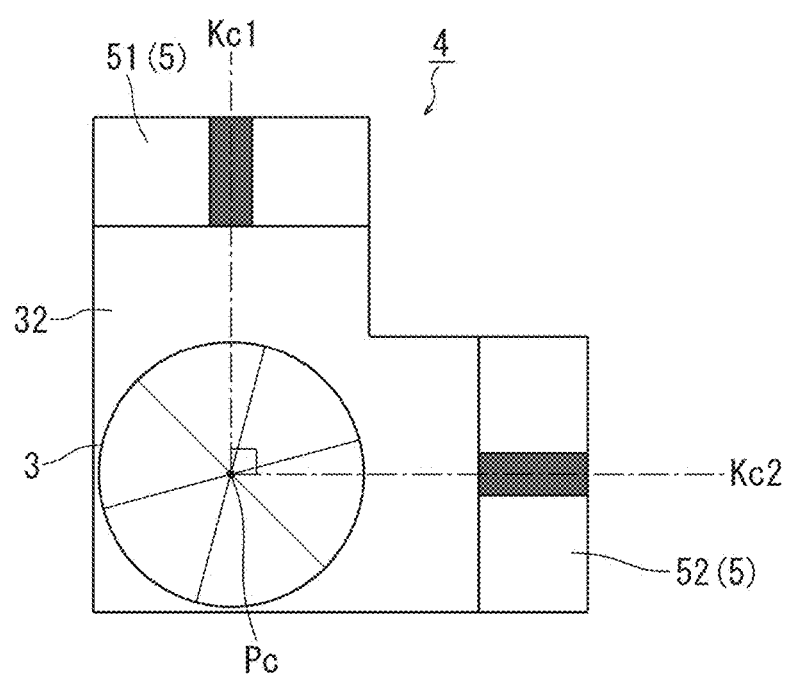
FIG. 20 A plan view of the pointing rod of FIG. 19.

FIG. 19 is a right-side perspective view showing the configuration of a pointing rod 4 in accordance with the third embodiment, and FIG. 20 is a plan view of the pointing rod 4. The pointing rod 4 includes a bar-shaped supporting element 31, the prism 3, the inclination sheet 5 and a board 32.

The description of the supporting element 31 is omitted because the element is similar to that of the first embodiment. The board 32 is fixed at the other end of the supporting element 31 perpendicular to the supporting element 31. The configuration of the board 32 is not described because the board 32 is similar to that of the first embodiment.

The prism 3 is fixed on the front surface of the board 32 such that the prism center Pc (floating point) is disposed on the axial direction PP of the pointing rod 4 (supporting element 31). A length from the prism center Pc to the front end (measurement point X) of the supporting element 31 is fixed as a known distance L. In the present embodiment, any material which can output parallel reflection rays from input rays and can perform the image analysis of the target center can be employed as the prism 3 other than a cube corner prism, and a retroreflection sheet is also usable.

A pair of inclination sheets 5 is arranged on a first position P1 and a second position P2 centering around the prism 3 on the front surface of the board 32. The configuration of the inclination sheet 5 of the present embodiment is different from that of the first embodiment. Therefore, one of the pair of the inclination sheets will be hereinafter referred to as a first uniaxial inclination sheet 51, and the other will be hereinafter referred to as a second uniaxial inclination sheet 52 for their discrimination.

The first uniaxial inclination sheet 51 is fixed on the first position P1 in which a sheet center line Kc1 is coincide with the prism center Pc and which separates an arbitrary distance from the prism 3. The second uniaxial inclination sheet 52 is fixed on the second position P2 in which a sheet center line Kc2 is coincide with the prism center Pc. The second sheet 52 is positioned at a place after 90 degree rotation with respect to the first position P1 (while the clockwise rotation is shown in FIGS. 19 and 20, the anti-clock wise rotation may be employed). Also in the present embodiment, the prism 3 and the uniaxial inclination sheets 51, 52 may be fixed by using an appropriate fixing means such as adhesion, screwing, concavo-convex engagement and welding.

(Uniaxial Inclination Sheet)

Figure 21A:
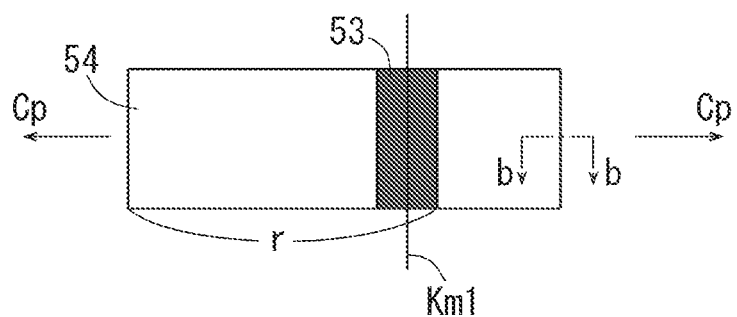
FIG. 21(A) is a plan view of the uniaxial inclination sheet.
Figure 21B:
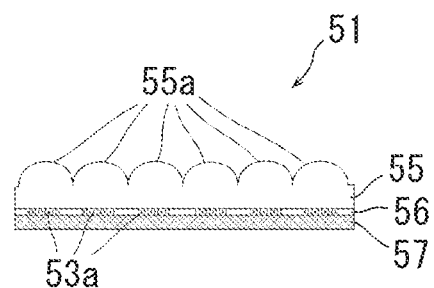
FIG. 21(B) is a partial sectional view of the uniaxial inclination sheet.
Figure 21C:
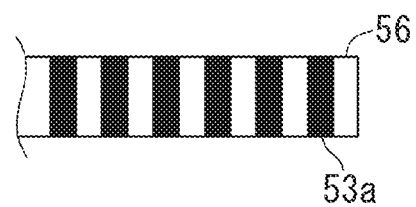
FIG. 21(C) is a partial plan view of an image-forming layer.

FIG. 21(A) is a plan view of the uniaxial inclination sheet 51 in accordance with the third embodiment, FIG. 21B is a partial sectional view of the uniaxial inclination sheet 51 (a sectional view taken along a line b-b of FIG. 21A), and FIG. 21C is a partial plan view of an image-forming layer 45. The description of the configuration of the second uniaxial inclination sheet 52 is omitted because the sheet 52 is similar to that of the first uniaxial inclination sheet 51.

As shown in FIG. 21(A), the uniaxial inclination sheet 51 includes a mark surface 54 on which a mark 53 for analysis appears. As shown in FIG. 21B, the uniaxial inclination sheet 51 includes a cylindrical lens sheet 55, an image-forming layer 56, and an image-forming medium 57. As shown in FIG. 21B, the cylindrical lens sheet 55 is formed by a plurality of cylindrical lenses 55a arranged in parallel. The cylindrical lens sheet 55 is focused on the image-forming layer 56. As shown in 21C, the image-forming layers 56 are repeatedly formed on the image-forming medium 57 such that image marks 53a formed by means of ink printing in a manner of one-to-one correspondence. The image-forming layer 56 and the image-forming medium 57 which are translucent are laminated by means of adhesion on a flat surface side of the cylindrical lens sheet 55 while keeping the translucence. The image mark 53a may be any shape such as a rectangle shown in the drawings if the mark center km1 can be obtained by the analysis of photographed images.

When the uniaxial inclination sheet 51 is viewed from the mark surface 54, a virtual image of the image mark 53a (that is, the mark 53 shown in FIG. 21A)), is seen to move, depending on a moving eye direction, in the longitudinal direction of the sheet (uniaxial direction) along the same direction as the moving eye direction, or to move along the opposite direction of the moving eye direction. While the moving direction of the mark 53 is determined by the size difference between the lens pitch and the image mark, no importance is attached to which of the lens pitch and the image mark is larger because it is sufficient that the mark 43 regularly moves depending on the moving eye direction.

The position of the mark 53 changes in one axis depending on the inclination angle while eye direction so that the change of the inclination angle with the eye direction can be related with a moving length "r" by using a function. Accordingly, the inclination angle of the uniaxial inclination sheet 51 with respect to the eye direction can be analyzed by imaging the mark surface 54 by its image analysis.

As described above, in the present embodiment, the uniaxial inclination sheets 51, 52 are fixed such that the respective mark surfaces 54 are positioned perpendicular to each other on the surface perpendicular to the axial direction PP of the pointing rod 4 while centering around a certain point (prism center Pc in this embodiment). In this arrangement, the three-dimensional position of the measurement point X can be measured by using the following method.

(Measurement Method)

The description of the summary of the measurement is omitted because the measurement is similar to that in the measurement flow chart of the three-dimensional position measurement system shown in FIG. 6(A).

(Measurement Method of Three-Dimensional Position)

Figure 22:
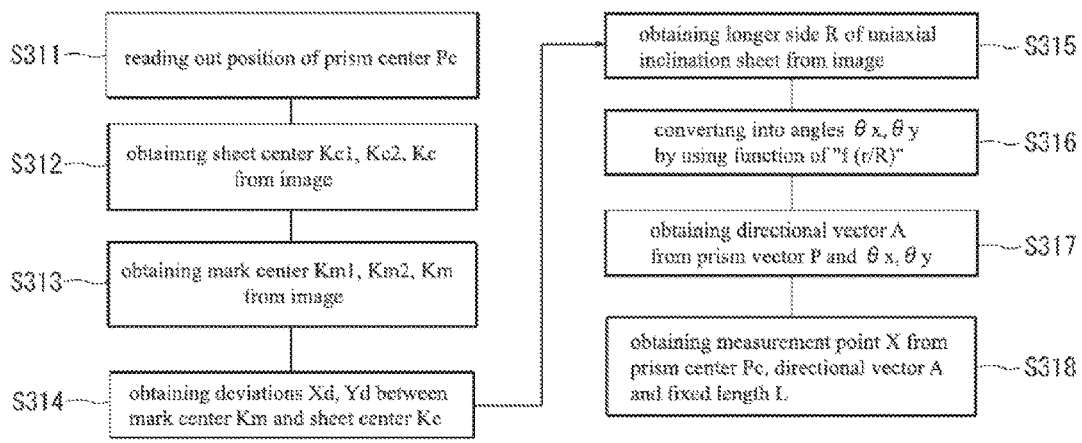
FIG. 22 A flow chart for calculating a three-dimensional position in accordance with the third embodiment.

The method of measuring the three-dimensional position of the measurement position X in the S15 or the step S25 of FIG. 6(B) in the third embodiment will be described. FIG. 22 is a flow chart for calculating the three-dimensional position in accordance with the third embodiment, and FIG. 23 is a conceptional drawing of the measurement method of the third embodiment for supplementing the description of the flow chart of FIG. 22.

The description of the step S311 is omitted because this steps is similar to the step S111 of the first embodiment.

Figure 23:
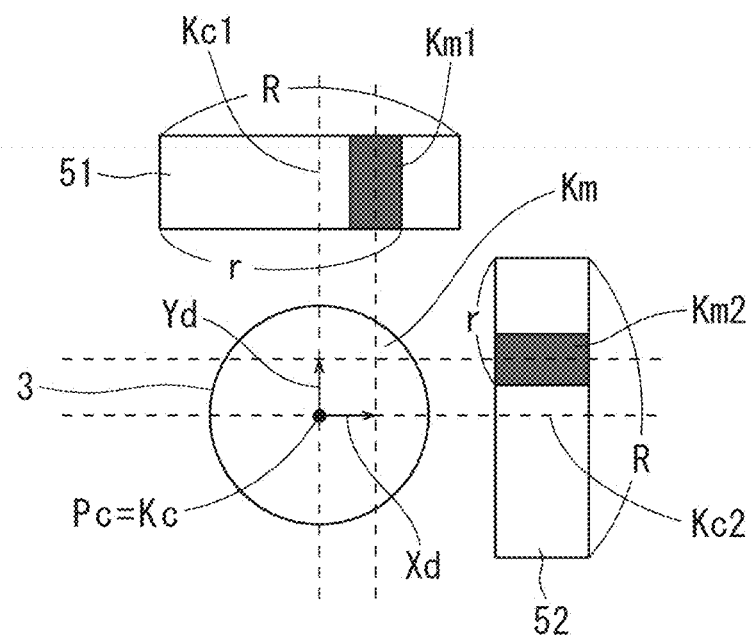
FIG. 23 A conceptional drawing of a measurement method of the third embodiment.

Then, at the step S312, the sheet center line Kc1 of the first uniaxial inclination sheet 51 and the sheet center line Kc2 of the second uniaxial inclination sheet 52 are image-analyzed by using the visual image shot at the image-taking section 22, and the sheet center Kc of the entire sheet is obtained from the intersection between the uniaxial inclination sheets 51, 52 (refer to FIG. 23).

Then, at the step S313, the mark center line Km1 of the mark 53 of the first uniaxial inclination sheet 51 and the mark center line Km2 of the mark 53 of the second uniaxial inclination sheet 52 are image-analyzed by using the visual image shot at the image-taking section 22, and the mark center Km of the entire sheet is obtained from the intersection between the mark center lines Km1, Km2.

Then, at a step 314, a horizontal direction-deviation value Xd and a vertical direction-deviation value Yd between the overall mark center Km and the overall sheet center Kc are obtained, and a mark moving length "r" is obtained (refer to FIG. 23).

Then, at a step 315, the longer sides R of the uniaxial inclination sheets 51, 52 are image-analyzed (refer to FIG. 23).

Then, at a step S316, an inclination angle θx of the first uniaxial inclination sheet 51 and an inclination angle θy of the second uniaxial inclination sheet 52 viewed from the eye direction "e" of the survey machine 2 are obtained by using a function of "f(r/R)=θ".

Then, the normal direction (directional vector A) of the mark surface of the overall uniaxial inclination sheets 51, 52 viewed from the eye direction of the survey machine 2 is obtained from the prism vector P at the prism center Pc, and the inclination angles θx and θy (refer to FIG. 10).

Then, at a step 318 the three-dimensional position of the measurement point X is obtained by moving the positional information from the three-dimensional position of the prism center Pc by the fixed length L along the directional vector A.

(Effects)

As described, in the third embodiment, the three-dimensional position of the measurement point X can be obtained from the three-dimensional position of the prism 3 (the measured values of the angle and the distance of the prism center Pc), the inclination angle of the overall inclination sheet 5 obtained from the uniaxial inclination sheets 51, 52 (the inclination angles θx and θy), and the fixed length L of the prism 3.

In the three-dimensional position measurement system 1 of the third embodiment, the respective mark surfaces 54 of the uniaxial inclination sheets 51, 52 are formed perpendicular to each other on the surface perpendicular to the axial direction PP of the pointing rod 4 centering around the prism center Pc so that the normal direction (directional vector A) of the mark surface of the overall sheet obtained by the analysis of the uniaxial inclination sheets 51, 52 is coincide with the axial direction PP of the pointing rod 4. This configuration enables the measurement of the measurement point X by moving the positional information from the prism center Pc of the prism vector P by the fixed length L along the directional vector A (refer to FIG. 10).

The image processing of detecting the outline 42 performed in the first embodiment is unnecessary to reduce the errors. Since the uniaxial inclination sheets 51, 52 are arranged such that the prism center Pc is coincide with the overall sheet center Kc, an operation of obtaining the directional vector B (step S113 in FIG. 7) is not required.

A worker can measure the three-dimensional position of the measurement point X without adjustment such as leveling of the prism 3 even if the pointing rod 4 is inclined only by contacting the front end of the pointing rod 4 at the measurement point X in accordance with the third embodiment so that the operation efficiency is elevated. As shown in FIG. 6(A), the combination with the automatic chasing enables the successive measurements only by contacting the pointing rods 4 to the points one after another which are to be measured because the measured values of the distance and the angle and the inclination angle are calculated on a real-time basis for renewing the position of the measurement point X so as to further elevate the operation efficiency.

No further sensor is required for measuring the inclination of the pointing rod 4 so that the inexpensive operation can be achieved. The higher accuracy can be obtained than the use of a sensor value because the measurement point X is calculated from the analysis value of the uniaxial inclination sheets 51, 52 based on the prism position which can be obtained with higher accuracy. The thin and compact uniaxial inclination sheets 51, 52 do not lower the workability.

Alternative Example

Followings are alternative examples of the third embodiment.

Figure 24:
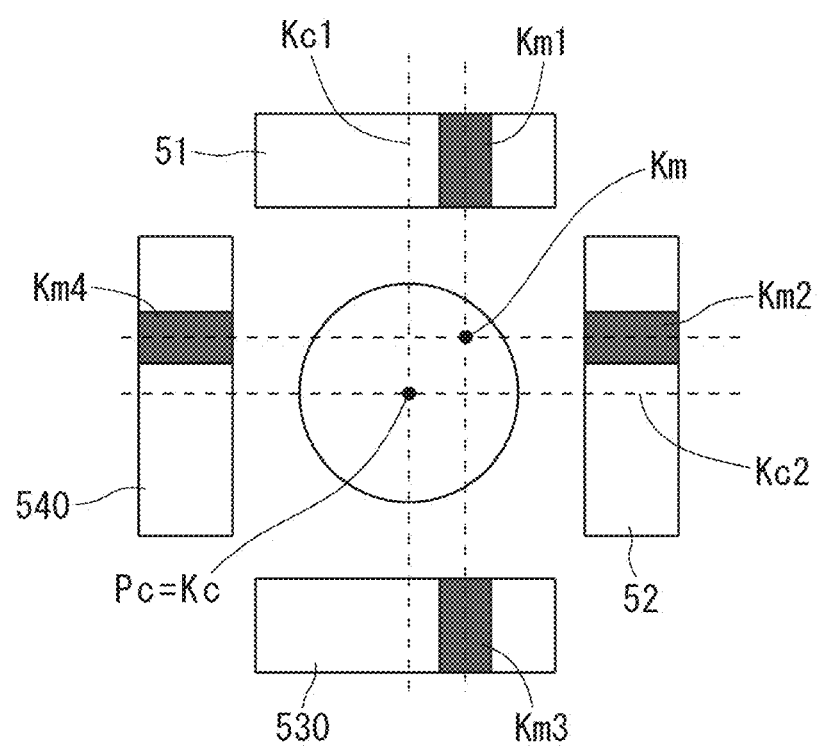
FIG. 24 An alternative example of the third embodiment.

FIG. 24 illustrates an alternative example of the third embodiment regarding the arrangement of the uniaxial inclination sheets. The uniaxial inclination sheets may be disposed, on the surface perpendicular to the axial direction of the pointing rod 4 toward the four directions centering around a certain point. In this case, when a third uniaxial inclination sheet 530 is disposed parallel to the first uniaxial inclination sheet 51, and a fourth uniaxial inclination sheet 540 is disposed parallel to the second uniaxial inclination sheet 52, the overall mark center Km can be obtained as the intersection between the line prepared by connecting the mark center line Km1 and the mark center line Km3, and the line prepared by connecting the mark center line Km2 and the mark center line Km4, by obtaining the mark center line Km3 of the third uniaxial inclination sheet 530 and the mark center line Km4 of the fourth uniaxial inclination sheet 540 in addition to the mark center line Km1 and the mark center line Km2 in the previous step S313. Accordingly, the calculation of the extending direction of the mark center line is unnecessary, and an amount of arithmetic processing at the step S313 can be reduced, especially when the pointing rod 4 is rotated (when it is rotated from the standard position in FIG. 23).

Figure 25:
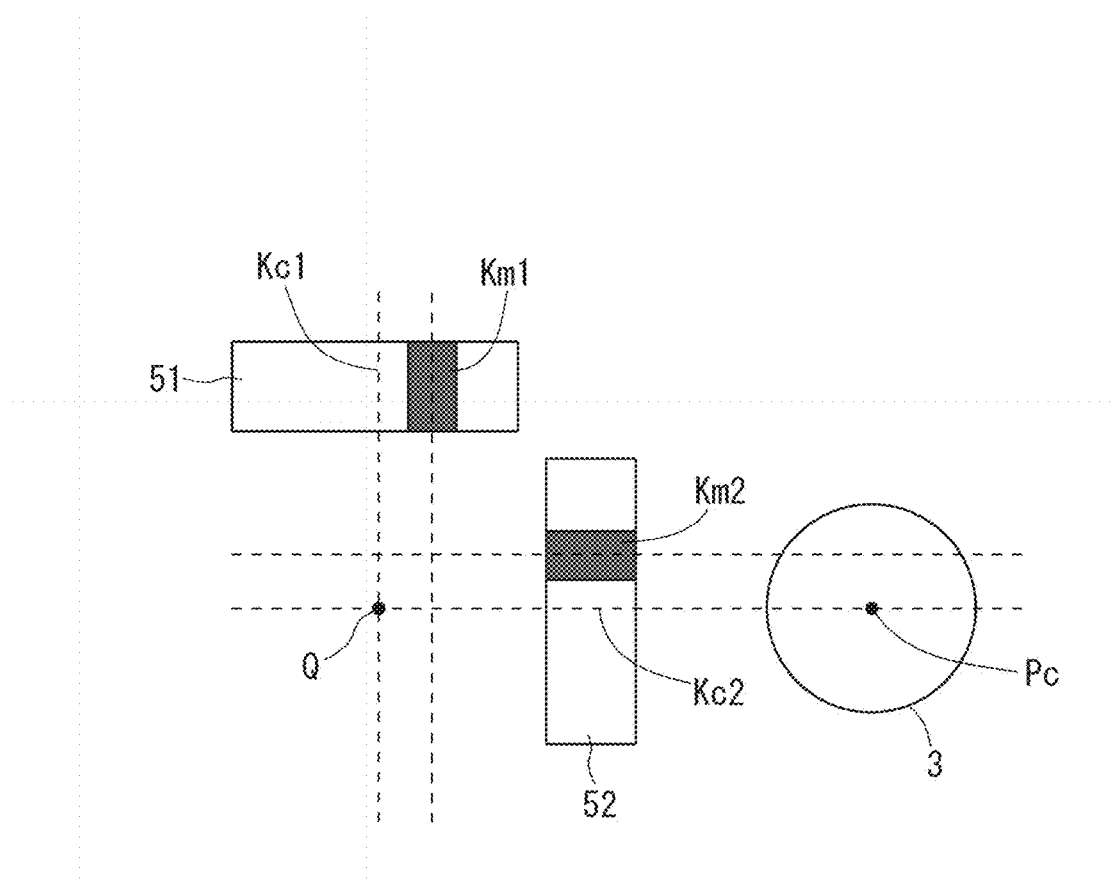
FIG. 25 An alternative example of the third embodiment.

FIG. 25 illustrates an alternative example of arranging the prism 3. The position of the prism 3 is arbitrary as long as the respective mark surfaces 54 of the uniaxial inclination sheets 51, 52 are formed on the surface perpendicular to the axial direction PP of the pointing rod 4 and are disposed at least perpendicular to each other centering around a certain point Q. In this case, the prism center Pc is not the overall sheet center Kc so that an operation of obtaining the directional vector B (step S113 of FIG. 7) may be performed between the S312 and S313.

Figure 26:
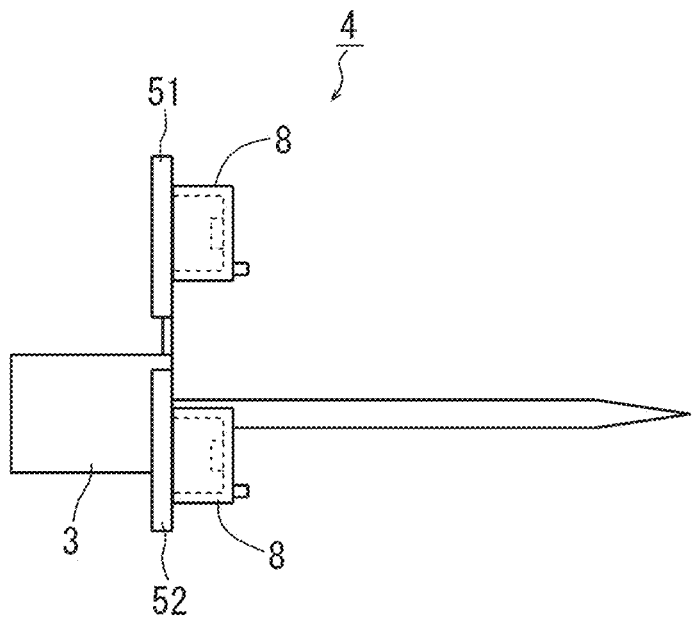
FIG. 26 An alternative example of the third embodiment.

FIG. 26 illustrates an alternative example of arranging the illumination device 8 on the rear surfaces of the uniaxial inclination sheets 51, 52. The configuration and the effects of the illumination device 8 are similar to those of the first embodiment.

Fourth Embodiment (Entire System)

The fourth embodiment is an alternative of the first embodiment and is different in that the prism 3 is not an indispensable element.

(Pointing Rod)

Figure 27:
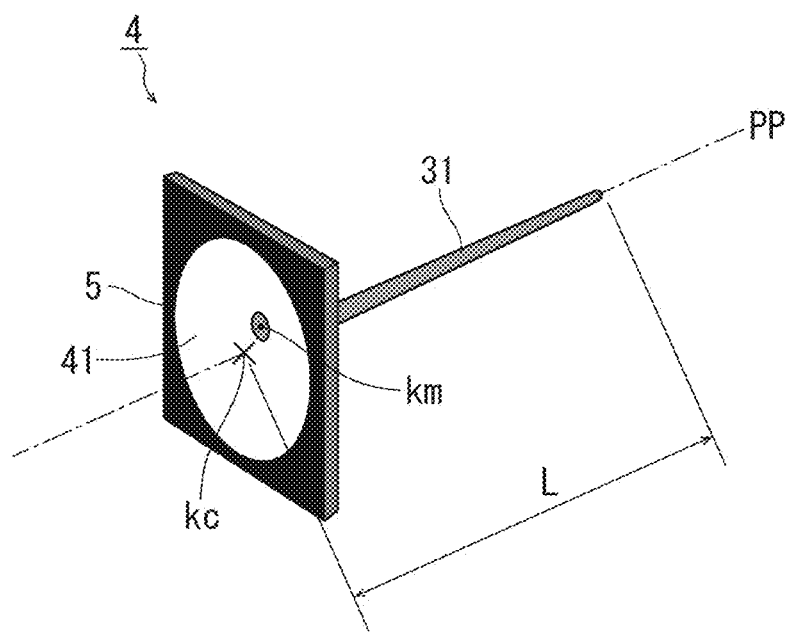
FIG. 27 A right-side perspective view showing a configuration of a pointing rod in accordance with a fourth embodiment.

FIG. 27 is a right-side perspective view showing the configuration of the pointing rod 4 in accordance with a fourth embodiment. The pointing rod 4 includes the bar-shaped supporting element 31 and the inclination sheet 5. The front end of the supporting element 31 is disposed at the measurement point X similarly to the first embodiment. The inclination sheet 5 is fixed at the other end of the supporting element 31 such that the mark surface 41 is disposed on a surface perpendicular to the axial direction PP of the pointing rod 4, and the sheet center Kc is disposed on the axial direction PP of the pointing rod 4. The length from the sheet center Kc to the front end of the supporting element 31 (measurement point X) is the known fixed length L. That is, in the fourth embodiment, the three-dimensional position of the measurement point X is measured by collimating the mark surface 41 of the inclination sheet 5 as a target and by measuring the distance of the sheet center Kc without a prism.

(Survey Machine)

Figure 28:
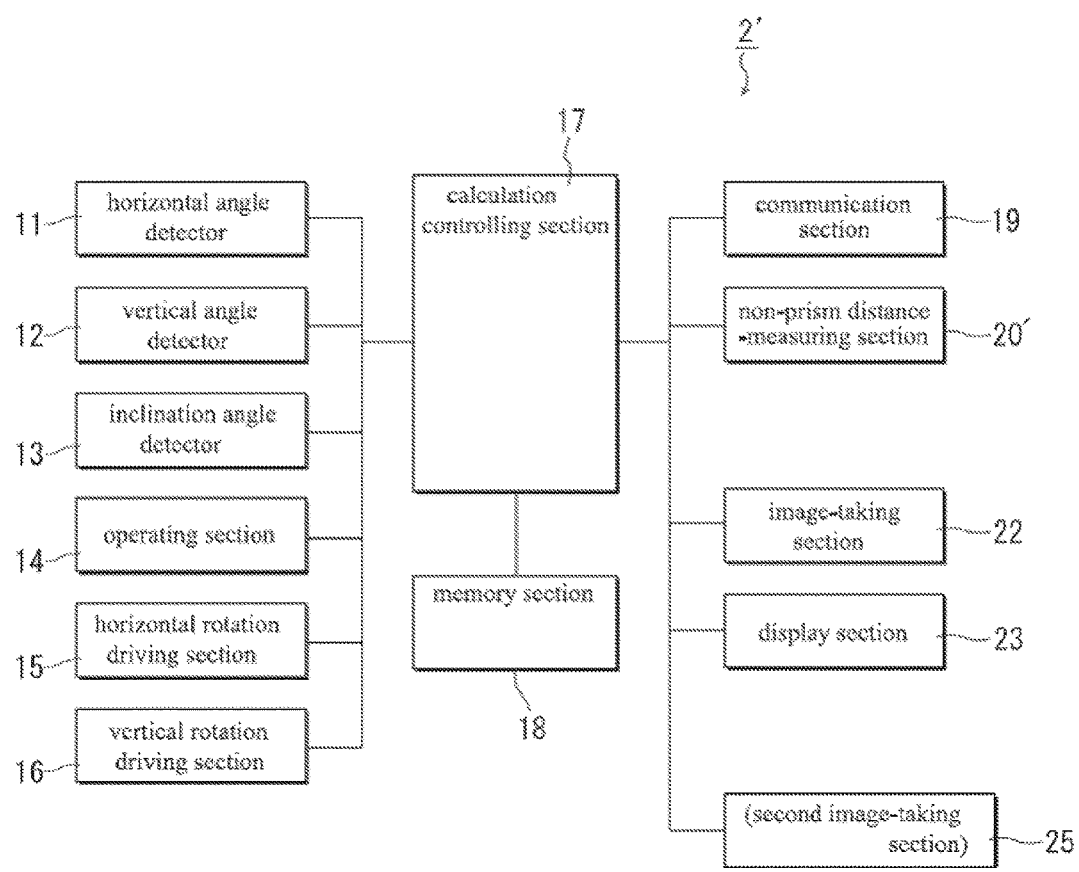
FIG. 28 A block diagram showing an internal configuration of a survey machine in accordance with the fourth embodiment.

FIG. 28 is a block diagram showing an internal configuration of the survey machine 2' in accordance with the fourth embodiment. The present embodiment can be conducted as long as the image-taking section 22 has higher accuracy by either the survey machine 2 used in the first embodiment or the survey machine 2 including the following configuration. In the survey machine 2' of FIG. 28, the EDM 20, the prism image-taking section 21 and the scanning section 24 which were previously used for collimating (chasing) the prism 3 are not indispensable, and a non-prism distance-measuring section 20' may be sufficient. The non-prism distance-measuring section 20' emits distance-measuring rays such as thin beam laser rays to measure a distance to a target other than the prism. In the present embodiment, the target is the mark surface 41 of the inclination sheet 5, and the collimation (chasing) to the sheet center Kc of the inclination sheet 5 is performed by a known image processing such as pattern-matching by means of imaging at the image-taking section 22.

(Measuring Method)

Figure 29A:
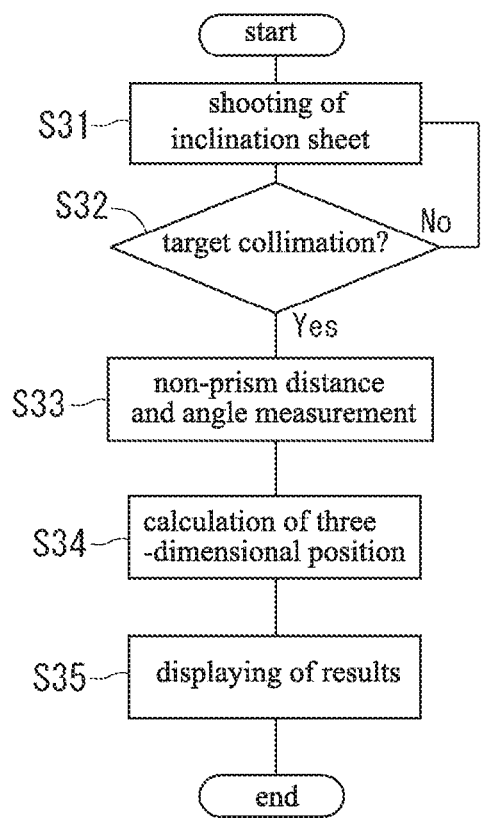
FIG. 29 (A) is a basic flow chart in accordance with the fourth embodiment.
FIG. 29(B) is a flow chart when an automatic chasing is conducted in accordance with the fourth embodiment.
Figure 29B:
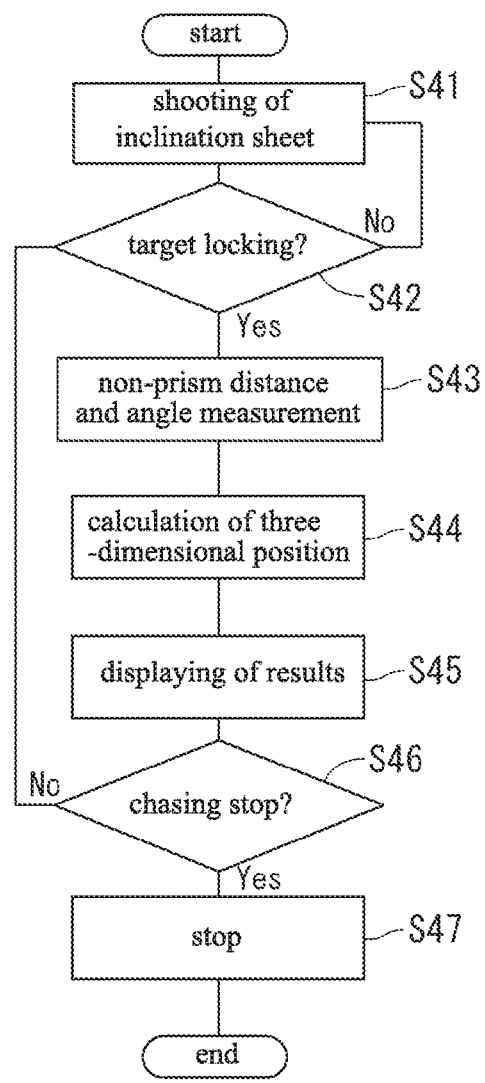

The summary of the measurement of the fourth embodiment will be described. FIG. 29(A) is a basic measurement flow chart of the system for measuring the three-dimensional position in accordance with the fourth embodiment, and FIG. 29B is a flow chart when an automatic chasing is conducted. As shown in FIG. 29(A), the inclination sheet 5 is basically imaged at the image-taking section 22 at a step S31. Then, at a step S32, the sheet center Kc is image-analyzed by using the imaged taken at the image-taking section 22. When the collimation is not performed, the processing returns to the step S31. When the collimation is performed, the processing is shifted to a step S33, and the distance and the angle of the sheet center Kc are measured for measuring the three-dimensional position of the sheet center Kc. Then, the processing is shifted to a step S34 where the three-dimensional position of the measurement point X is calculated. Then, the processing is shifted to a step S35 for displaying the measurement point X on the display section 23, and the processing is ended. In case of the automatic chasing, as shown in FIG. 29B at the step S41, the inclination sheet 5 is imaged at the image-taking section 22. Then, at a step 42, whether the sheet center Kc acting as the target is locked (automatically collimated) or not is judged, and when the locking is completed, the processing returns to a step 43 where the distance and the angle of the sheet center Kc are measured. Other steps S44 to S47 are similar to the steps S25 to S28 of FIG. 6.

(Calculating Method of Three-Dimensional Position)

Figure 30:
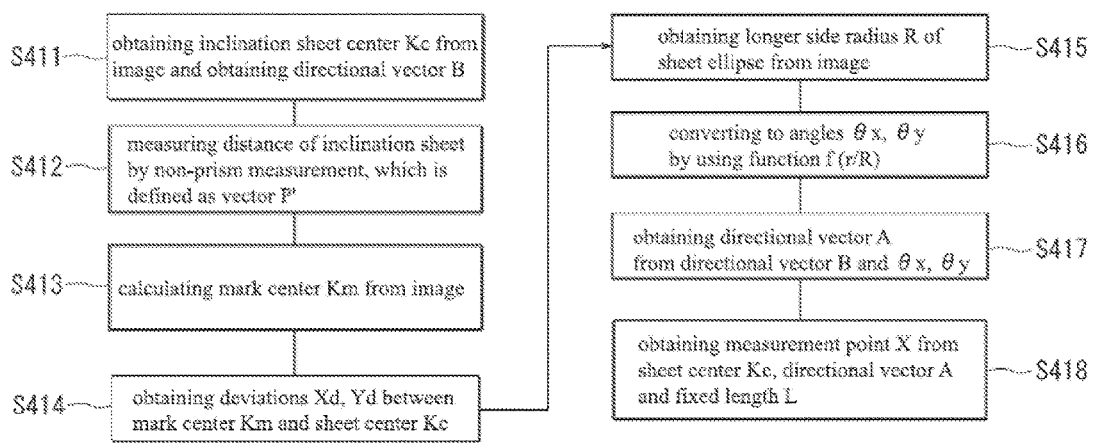
FIG. 30 A flow chart for calculating a three-dimensional position in accordance with the fourth embodiment.
Figure 31:
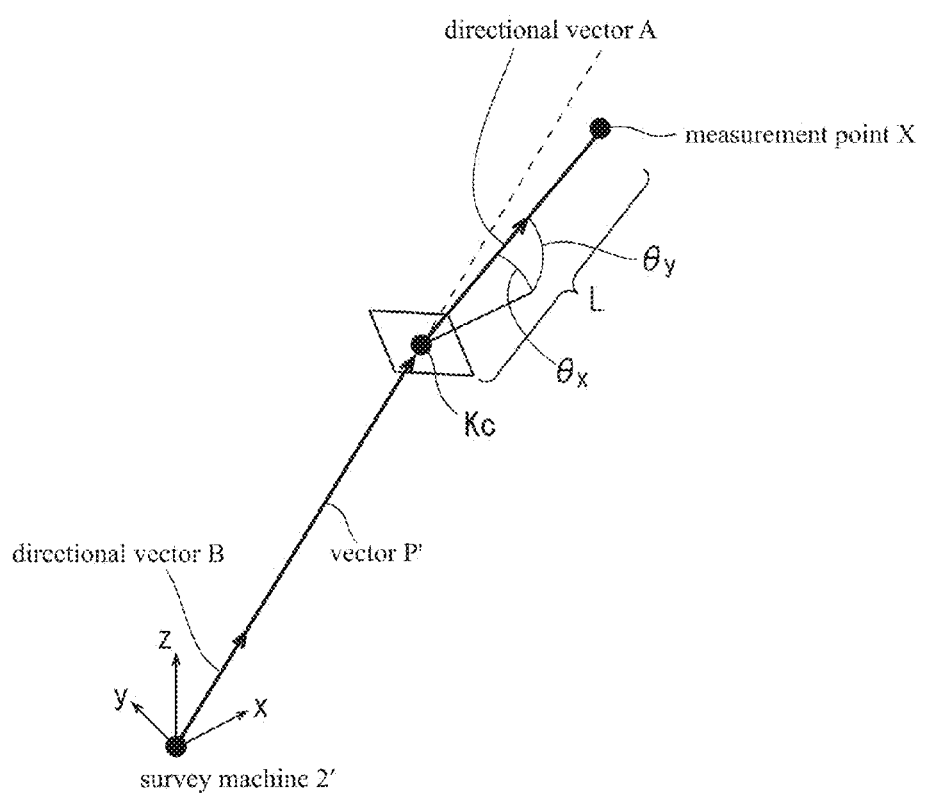
FIG. 31 A conceptional drawing of a measurement method of the fourth embodiment.

The method of measuring the three-dimensional position of the measurement position X in a step S34 or S44 of FIG. 29 in the fourth embodiment will be described. FIG. 30 is a flow chart for calculating the three-dimensional position in accordance with the fourth embodiment, and FIG. 31 is a conceptional drawing of the measurement method of the fourth embodiment. At first, at a step S411, the sheet center Kc of the inclination sheet 5 is image-analyzed from the visual image taken at the image-taking section 22 for obtaining the positional direction of the inclination sheet 5 (directional vector B) (refer to FIG. 31). Then, at a step S412, after the value of distance of the sheet center Kc is measured at the non-prism distance-measuring section 20', and the value of the angle of the sheet center Kc obtained at the horizontal angle detector 11 and the vertical angle detector 12 is measured, a vector P' to the sheet center Kc is obtained. Steps S413 to S417 are similar to the steps S114 to S118 (FIG. 7) of the first embodiment. Finally, at a step S418, the three-dimensional position of the measurement point X is obtained by moving the three-dimensional position of the sheet center Kc obtained from the above measured values of the distance and the angle of the inclination sheet 5 along the directional vector A by the fixed length L.

(Effects)

As described, in the fourth embodiment, the three-dimensional position of the measurement point X can be measured similarly to the first embodiment, even without the prism 3, by replacing the process of measuring the distance with the prism by means of the collimation (chasing) of the prism 3 of the first embodiment with the process of measuring the distance without the prism by means of the collimation (chasing) of the inclination sheet 5.

Alternative Example

Also in the fourth embodiment, the position of the inclination sheet 5 may be offset to any arbitrary position as long as the mark surface 41 is disposed on the surface perpendicular to the axial direction PP of the pointing rod 4 following in FIG. 11. In this case, an analysis pattern which enables image recognition (high precision pattern easily collimated) may be arranged at a position deviated by the fixed length L from the measurement point X. An example of the above analysis pattern includes a bar code such as a pattern having a concentric circle, QR code (registered trademark) or a pattern having color different from that of the inclination sheet 5. Also in the fourth embodiment, the illumination device 8 may be disposed on the rear surface of the inclination sheet 5.

Fifth Embodiment

(Entire System)

The fifth embodiment is an alternative of the second embodiment and is different in that the prism 3 is not an indispensable element.

(Pointing Rod)

Figure 32:
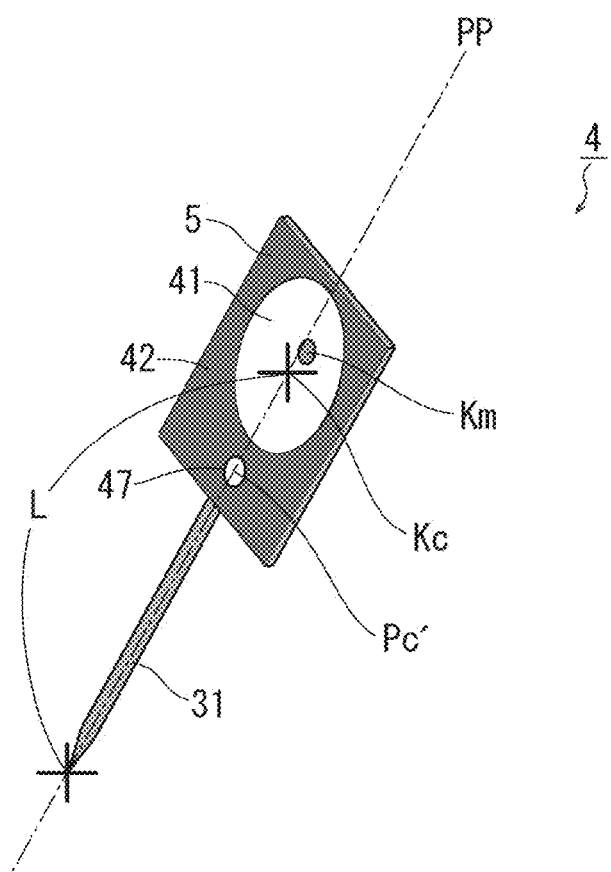
FIG. 32 A right-side perspective view showing a configuration of a pointing rod in accordance with a fifth embodiment.

FIG. 32 is a right-side perspective view showing the configuration of the pointing rod 4 in accordance with a fifth embodiment. The pointing rod 4 includes the bar-shaped supporting element 31 and the inclination sheet 5. The inclination sheet 5 of this embodiment includes a second mark 47 which enables pattern recognition on its outline 42. The front end of the supporting element 31 is disposed at the measurement point X similarly to the first embodiment. The inclination sheet 5 is fixed parallel to the supporting element 31 at the other end of the supporting element 31 such that the sheet center Kc of the inclination sheet 5, and the mark center Pc' of the second mark 47 are disposed on the axial direction PP of the pointing rod 4, that is, the measurement point X, the sheet center Kc and the second mark center Pc' are positioned on the same single line. The length from the sheet center Kc to the measurement point X is the known fixed length L.

(Survey Machine)

Also in this embodiment, the survey machine 2' shown in FIG. 28 may be used in place of the survey machine 2 of the second embodiment.

(Measurement Method)

The summary of the measurement in the present embodiment is similar to that depicted in the measurement flow charts of the system for measuring the three-dimensional position of FIG. 29(A).

(Calculating Method of Three-Dimensional Position)

Figure 33:
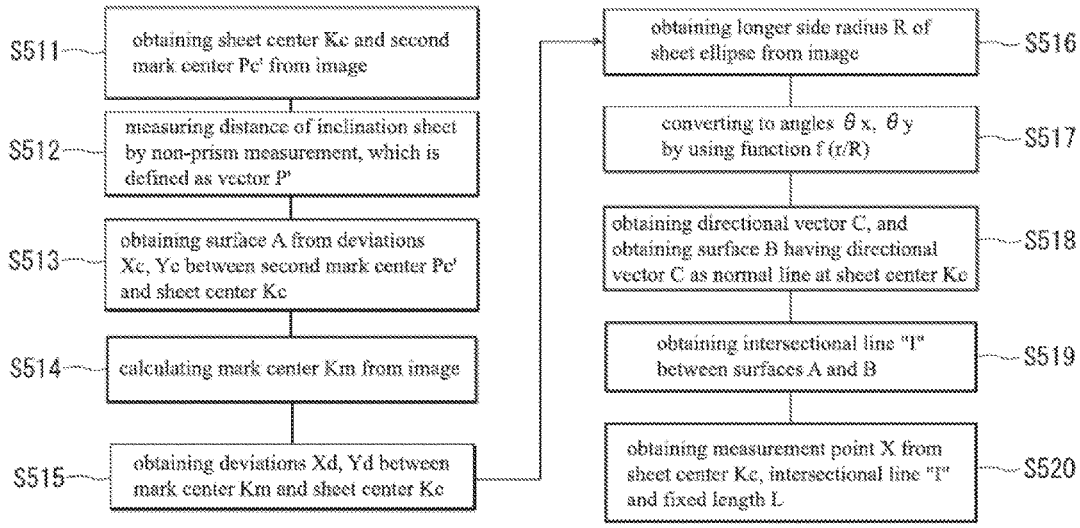
FIG. 33 A flow chart for calculating a three-dimensional position in accordance with the fifth embodiment.

The method of measuring the three-dimensional position of the measurement position X in the step S34 of FIG. 29(A) or S44 of FIG. 29(B) in the fifth embodiment will be described. FIG. 33 is a flow chart for calculating the three-dimensional position in accordance with the fifth embodiment, and FIG. 34 is a conceptional drawing of the measurement method of the fifth embodiment.

At first, at a step S511, the sheet center Kc of the inclination sheet 5 and the mark center Pc' of the second mark 47 are image-analyzed from the visual image taken at the image-taking section 22.

Then, at a step S512, after the value of distance of the sheet center Kc is measured at the non-prism distance-measuring section 20', and the value of the angle of the sheet center Kc obtained at the horizontal angle detector 11 and the vertical angle detector 12 is measured, a vector P' to the sheet center Kc is obtained.

Figure 34:
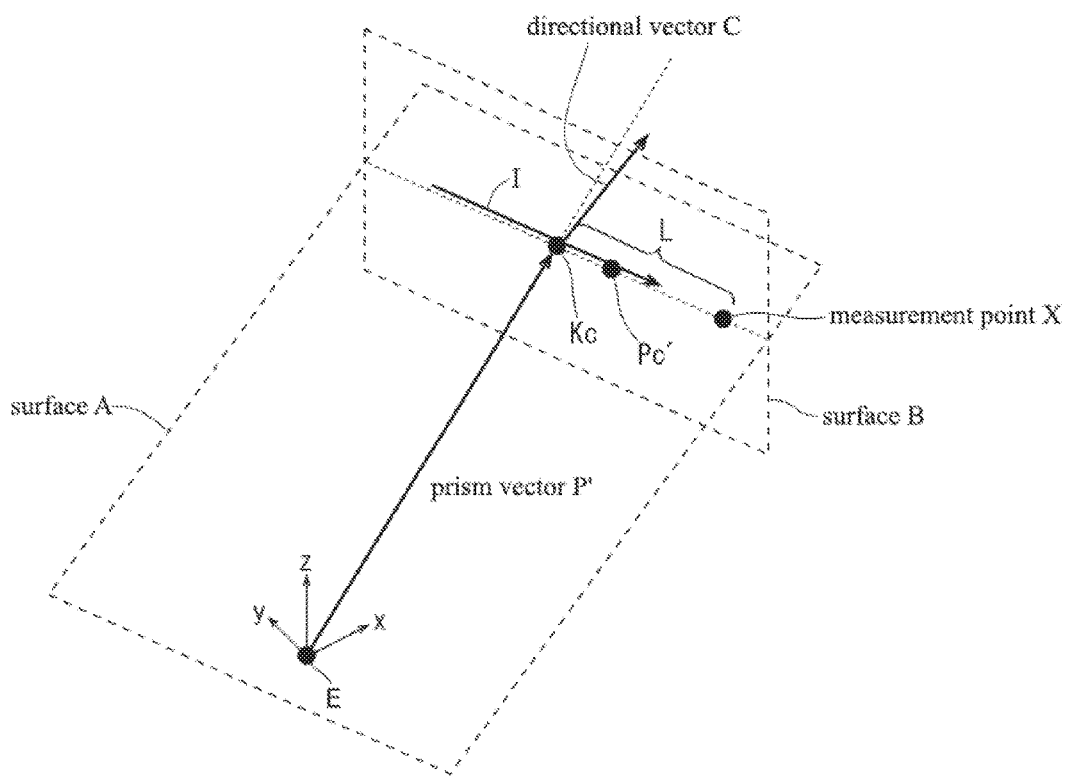
FIG. 34 A conceptional drawing of a measurement method of the fifth embodiment.

Then, at a step 513, a horizontal direction-deviation value Xc and a vertical direction-deviation value Yc between positions of the second mark center Pc' and the sheet center Kc on the image are obtained, and a surface A (first surface) including three points, that is, the second mark center Pc', the sheet center Kc, and an observing point E of the survey machine 2 (refer to FIG. 34).

Steps S514 to S517 are similar to the steps S214 to S217 shown in the second embodiment.

Then, at a step S518, a normal direction of the inclination sheet 5 (directional vector C) viewed from the eye direction of the survey machine 2 is obtained from the inclination angles θx and θy obtained at the step S517 (refer to FIG. 34), and a surface B (second surface) is obtained having the directional vector C as a normal line at the sheet center Kc (refer to FIG. 34). Then, at a step S519, an intersectional line "I" between the surface A and the surface B is obtained. Then, at a step S520, the three-dimensional position of the measurement point X can be obtained by moving the positional information from the three-dimensional position of the sheet center Kc along the intersectional line "I" by the fixed length L.

(Effects)

As described, in the fifth embodiment, the process of measuring the distance by collimating (chasing) the prism 3 in the second embodiment is replaced with the process of measuring the distance by collimating (chasing) the inclination sheet 5 without using the prism for making the second mark 47 for obtaining the surface A (intersectional line "I"). In this manner, similarly to the second embodiment, the three-dimensional position of the measurement point X can be measured with the excellent operation efficiency even without the prism 3.

Alternative Example

Also in the fifth embodiment, the position of the inclination sheet 5 is arbitrary as long as the measurement point X, the sheet center Kc and the second mark center Pc' are positioned on the same single line, and the length from the sheet center Kc to the measurement point X is the known fixed length L. The second mark 47 is arbitrary as long as its pattern is known and its center can be analyzed. As shown, the mark 47 preferably has a larger color contrast with respect to the outline 42 such as a white dot. Also in the fifth embodiment, the illumination device 8 may be disposed on the rear surface of the inclination sheet 5.

Sixth Embodiment (Entire System)

Figure 35:
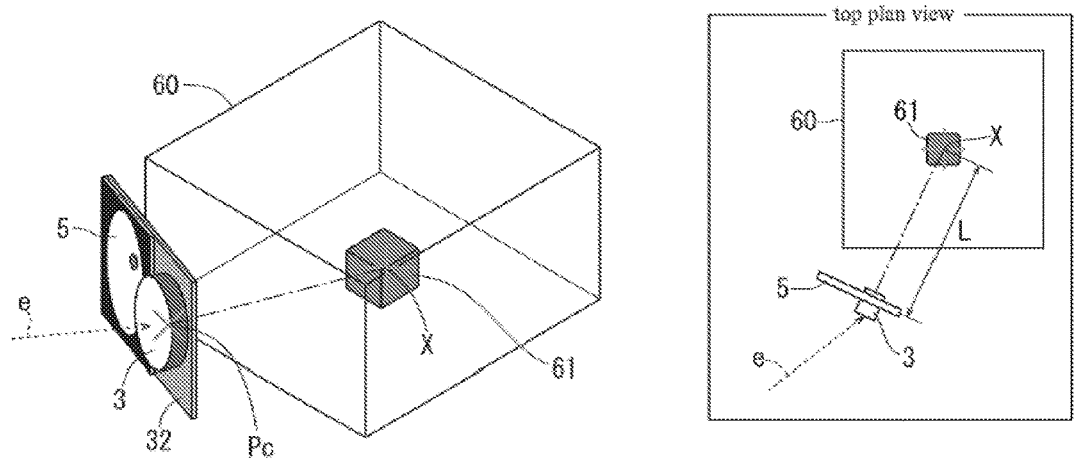
FIG. 35 A right-side perspective view showing a configuration in accordance with a sixth embodiment.

The sixth embodiment is an alternative of the first embodiment and is different in that the bar (supporting element 31) is not an indispensable element. FIG. 35 is a right-side perspective view showing the configuration of the sixth embodiment. The survey machine 2 may be similar to that of the first embodiment, and the prism 3 is preferably imaged at the prism image-taking section 21. The sixth embodiment does not include the supporting element 31, and includes the prism 3, the inclination sheet 5 and the board 32.

(Effects)

Even without the supporting element 31, when the prism 3 (prism center Pc) is arranged at the position which is offset from the measurement point X by the fixed length L, and the mark surface 41 of the inclination sheet 5 is formed on the surface perpendicular to the line between the measurement point X and the prism center Pc, the three-dimensional position of the measurement point X can be measured in accordance with a process (flow chart of FIG. 7) similar to that of the first embodiment. The present embodiment is effective, for example, as shown in FIG. 35, when the prism 3 cannot be positioned near a sensor 61 built in a certain housing 60 of an apparatus due to the existence of the housing 60. The fixed length L may be obtained in a design drawing of the apparatus.

Seventh Embodiment (Entire System)

Figure 36:
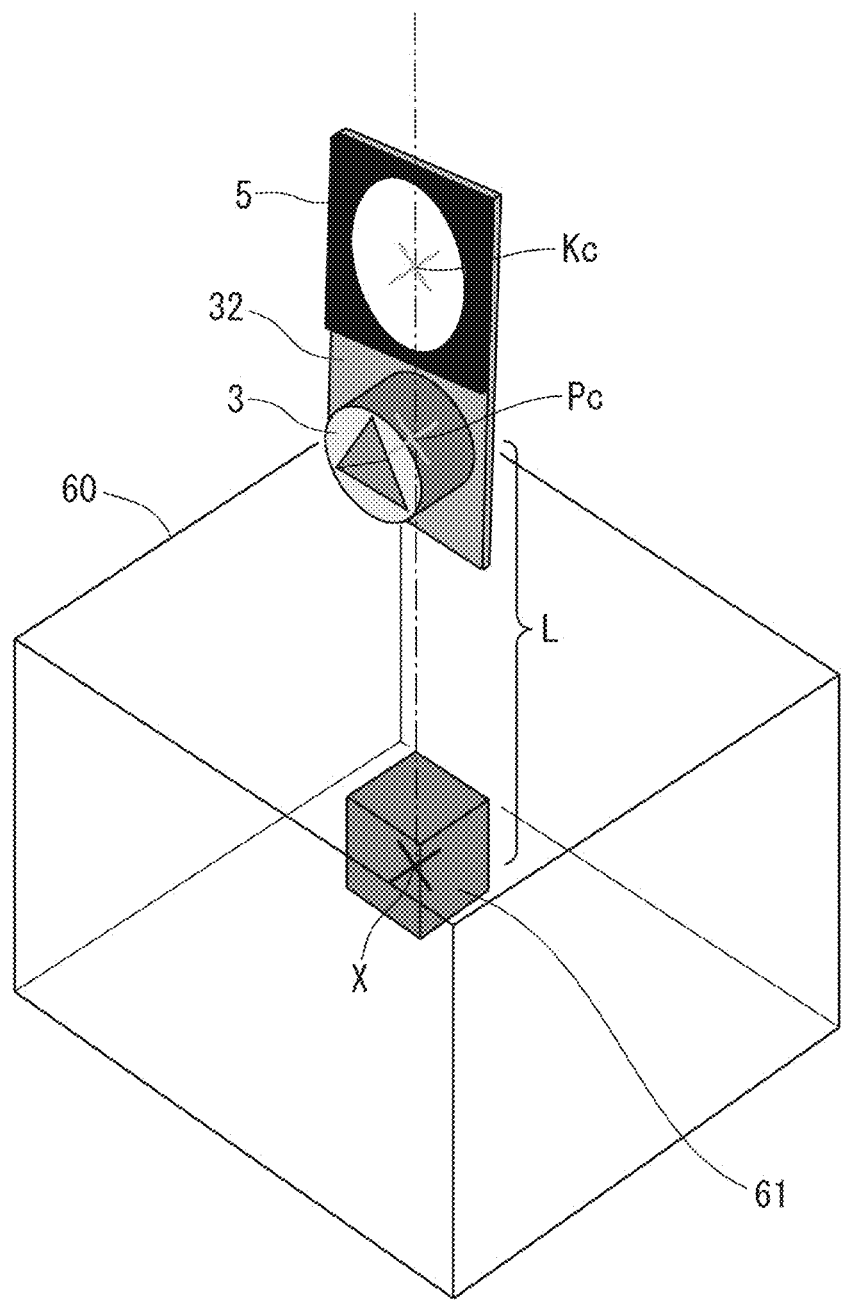
FIG. 36 A right-side perspective view showing a configuration in accordance with a seventh embodiment.

Similarly to the above, the seventh embodiment is different from the second embodiment in that the bar (supporting element 31) is not an indispensable element. FIG. 36 is a right-side perspective view showing the configuration of the seventh embodiment. The survey machine 2 may be similar to that of the second embodiment, and the prism 3 is preferably imaged at the prism image-taking section 21. The seventh embodiment does not include the supporting element 31, and includes the prism 3, the inclination sheet 5 and the board 32.

(Effects)

Even without the supporting element 31, when the sheet center Kc, the prism center Pc and the measurement point X are positioned on the same single line, and the prism center Pc is arranged at the position which is offset from the measurement point X by the fixed length L, the three-dimensional position of the measurement point X can be measured in accordance with a process (flow chart of FIG. 15) similar to that of the second embodiment.

In the sixth and seventh embodiments, the three-dimensional position of the measurement point X can be measured even when the distance of the inclination sheet 5 is measured without the prism 3 in place of using the prism following in the fifth and sixth embodiments.

In addition, as another alternative example of all of the above embodiments, a wider-angle second image-taking section 25 may be equipped to the survey machine 2 to eliminate a possibility that the prism 3 and/or the inclination sheet 5 is out of the viewing field of the image-taking section 22 during the short-range measurement.

A measurement trajectory during the operation can be left in the job site by equipping a marking pen at the front end of the supporting element 31 of the pointing rod 4. The information such as velocity depicted in the calculation controlling section 17 can be also obtained because the depicted trajectory (measurement point X) is recorded as a data on a real-time basis.

The length of the pointing rod 4 may be configured to be freely stretchable if the fixed length L is precisely read out and the accurate position is correctly determined.

While the embodiments and the alternative examples of the system 1 for measuring the three-dimensional position in accordance with the present invention have been described, these are examples of the present invention, and the respective examples and alternative examples can be combined based on the knowledge of a skilled technician. The combined embodiments are included in the scope of the present invention.

DESCRIPTION OF SYMBOLS

1 system for measuring three-dimensional position
2 survey machine
3 prism
4 pointing rod
5 inclination sheet
51, 52 uniaxial inclination sheet (inclination sheet)
11 detector of horizontal angle (angle-measuring section)
12 detector of vertical angle (angle-measuring section)
17 calculation controlling section
20 EDM (distance-measuring section)
21 prism image-taking section
22 image-taking section
41, 54 mark surface
43, 53 mark
Kc sheet center
Pc prism center
Km mark center
θx, θy inclination angle
L fixed length
surface A (first surface)
surface B (second surface)
P1 first position
P2 second position
20' non-prism distance-measuring section
47 second mark
Pc' second mark center

The invention claimed is:
1. A system of measuring a three-dimensional position of a measurement point, the system comprising:
a survey machine including a distance measuring section of measuring a distance to a prism acting as a target, an angle measuring section, and an image-taking section;
a pointing rod which is positioned on the measurement point and includes the prism at a position deviated from the measurement point by a known fixed length; and
an inclination sheet having a mark which can indicate an inclination angle from an eye direction, wherein the mark surface having the mark of the inclination sheet is formed on a surface perpendicular to an axial direction of the pointing rod, the mark surface is imaged at the image-taking section, and the inclination angle of the inclination sheet with respect to the eye direction from the survey machine is calculated by image-analyzing the mark surface, and the three-dimensional position of the measurement point is determined from a three-dimensional position of the prism obtained in the distance measuring section and the angle measuring section in a normal direction of the mark surface and from both the inclination angle of the inclination sheet and by the fixed length,
wherein the image-taking section includes a scene-taking section of shooting a surrounding scene of the prism, and a prism image-taking section of shooting the prism, a mark surface having the mark is imaged at the scene-taking section, and the inclination angle of the inclination sheet with respect to the eye direction from the survey machine is calculated by image-analyzing the mark surface, and the three-dimensional position of the measurement point is measured from a three-dimensional position of the prism obtained in the distance measuring section and the angle measuring section after imaging the prism with the prism image-taking section for collimating the prism, the inclination angle of the inclination sheet and the fixed length.

2. A system of measuring a three-dimensional position of a measurement point, the system comprising:
a survey machine including a distance measuring section of measuring a distance to a prism acting as a target, an angle measuring section, and an image-taking section;
a pointing rod which is positioned on the measurement point and includes the prism at a position deviated from the measurement point by a known fixed length; and
an inclination sheet having a mark which can indicate an inclination angle from an eye direction, wherein a sheet center of the inclination sheet is formed on a line between the measurement point and a prism center of the prism, a first surface including the sheet center, the prism center and the eye direction from the survey machine is obtained after the mark surface having the mark is imaged in the image-taking section and image-analyzed for obtaining the sheet center, a second surface is calculated having a normal line which is a normal line of the inclination sheet viewed in the eye direction from the survey machine, and an intersectional line between the first surface and the second surface is obtained, and the three-dimensional position of the measurement point is determined from a three-dimensional position of the prism obtained in the distance measuring section and the angle measuring section in a direction along the intersectional line by the fixed length,
wherein the image-taking section includes a scene-taking section of shooting a surrounding scene of the prism, and a prism image-taking section of shooting the prism, a mark surface having the mark is imaged at the scene-taking section, and the inclination angle of the inclination sheet with respect to the eye direction from the survey machine is calculated by image-analyzing the mark surface, and the three-dimensional position of the measurement point is measured from a three-dimensional position of the prism obtained in the distance measuring section and the angle measuring section after imaging the prism with the prism image-taking section for collimating the prism, the inclination angle of the inclination sheet and the fixed length.

3. A system of measuring a three-dimensional position of a measurement point, the system comprising:
a survey machine including a distance measuring section of measuring a distance to a prism acting as a target, an angle measuring section, and an image-taking section;
a pointing rod which is positioned on the measurement point and includes the prism at a position deviated from the measurement point by a known fixed length; and at least two inclination sheets each having a mark surface, the mark surface having a mark which can indicate an inclination angle from an eye direction,
wherein the mark surfaces are arranged on a surface perpendicular to an axial direction of the pointing rod, centering around a certain point and oriented 90 degrees from one another with respect to a line drawn through the point, the mark surface is imaged at the image-taking section, and the inclination angle of the inclination sheet with respect to the eye direction from the survey machine is calculated by image-analyzing the mark surface, and the three-dimensional position of the measurement point determined from a three-dimensional position of the prism obtained in the distance measuring section and the angle measuring section in a normal direction of the mark surface and from both the inclination angle of the inclination sheet and by the fixed length,
wherein the image-taking section includes a scene-taking section of shooting a surrounding scene of the prism, and a prism image-taking section of shooting the prism, a mark surface having the mark is imaged at the scene-taking section, and the inclination angle of the inclination sheet with respect to the eye direction from the survey machine is calculated by image-analyzing the mark surface, and the three-dimensional position of the measurement point is measured from a three-dimensional position of the prism obtained in the distance measuring section and the angle measuring section after imaging the prism with the prism image-taking section for collimating the prism, the inclination angle of the inclination sheet and the fixed length.

4. A system of measuring a three-dimensional position of a measurement point, the system comprising:
a survey machine including a distance measuring section of measuring a distance to a target, an angle measuring section, and an image-taking section; and a pointing rod which is positioned on the measurement point and includes, at a position deviated from a known fixed length from the measurement point,
a fixed inclination sheet having a mark which enables determination of an inclination angle with respect to an eye direction, wherein the mark surface having the mark of the inclination sheet is formed on a surface perpendicular to an axial direction of the pointing rod, the mark surface is imaged at the image-taking section, and the inclination angle of the inclination sheet with respect to the eye direction from the survey machine is calculated by image-analyzing the mark surface, and the three-dimensional position of the measurement point is determined from a three-dimensional position of a sheet center of the inclination sheet obtained in the distance measuring section and the angle measuring section, while using the inclination sheet as the target in a normal direction of the mark surface and from both the inclination angle of the inclination sheet and by the fixed length,
wherein the image-taking section includes a scene-taking section of shooting a surrounding scene of the target, a mark surface having the mark is imaged at the scene-taking section, and the inclination angle of the inclination sheet with respect to the eye direction from the survey machine is calculated by image-analyzing the mark surface, and the three-dimensional position of the measurement point is measured from a three-dimensional position of the target obtained in the distance measuring section and the angle measuring section with pattern-matching by means of the scene-taking section, the inclination angle of the inclination sheet and the fixed length.

5. A system of measuring a three-dimensional position of a measurement point, the system comprising:
a survey machine including a distance measuring section of measuring a distance to a target, an angle measuring section, and an image-taking section; and
a pointing rod which is positioned on the measurement point and includes, at a position deviated from a known fixed length from the measurement point, a fixed inclination sheet having a mark which enables determination of an inclination angle with respect to an eye direction, wherein a second mark which enables pattern recognition is formed on a position other than a mark surface having the mark of the inclination sheet such that the measurement point, a sheet center of the inclination sheet and a mark center of the second mark are formed on a same single line, the sheet center and the mark center of the second mark are obtained by imaging and image-analyzing the mark surface and the second mark in the image-taking section, and a first surface including the sheet center and the mark center of the second mark and the eye direction from the survey machine is calculated, a second surface is calculated having a normal line which is a normal line of the inclination sheet viewed in the eye direction from the survey machine, and an intersectional line between the first surface and the second surface is obtained, and the three-dimensional position of the measurement point is determined from a three-dimensional position of a sheet center of the inclination sheet obtained in the distance measuring section and the angle measuring section, while using the inclination sheet as the target, in a direction of the intersectional line by the fixed length,
wherein the image-taking section includes a scene-taking section of shooting a surrounding scene of the target, a mark surface having the mark is imaged at the scene-taking section, and the inclination angle of the inclination sheet with respect to the eye direction from the survey machine is calculated by image-analyzing the mark surface, and the three-dimensional position of the measurement point is measured from a three-dimensional position of the target obtained in the distance measuring section and the angle measuring section with pattern-matching by means of the scene-taking section, the inclination angle of the inclination sheet and the fixed length.

6. A system of measuring a three-dimensional position of a measurement point, the system comprising:
a survey machine including a distance measuring section of measuring a distance to a prism acting as a target and being fixed at a position deviated from the measurement position by a known fixed length, an angle measuring section, and an image-taking section; and an inclination sheet having a mark which can indicate an inclination angle with respect to an eye direction, wherein a mark surface having the mark of the inclination sheet is formed on a surface perpendicular to a line between the measurement point and a prism center of the prism, the mark surface is imaged at the image-taking section, and the inclination angle of the inclination sheet with respect to the eye direction from the survey machine is calculated by image-analyzing the mark surface, and the three-dimensional position of the measurement point is determined from a three-dimensional position of the prism obtained in the distance measuring section and the angle measuring section in a normal direction of the mark surface and from both the inclination angle of the inclination sheet and by the fixed length, wherein the image-taking section includes a scene-taking section of shooting a surrounding scene of the prism, and a prism image-taking section of shooting the prism, a mark surface having the mark is imaged at the scene-taking section, and the inclination angle of the inclination sheet with respect to the eye direction from the survey machine is calculated by image-analyzing the mark surface, and the three-dimensional position of the measurement point is measured from a three-dimensional position of the prism obtained in the distance measuring section and the angle measuring section after imaging the prism with the prism image-taking section for collimating the prism, the inclination angle of the inclination sheet and the fixed length.

7. A system of measuring a three-dimensional position of a measurement point, the system comprising:

a survey machine including a distance measuring section of measuring a distance to a prism acting as a target and being fixed at a position deviated from the measurement position by a known fixed length, an angle measuring section, and an image-taking section; and an inclination sheet having a mark which can indicate an inclination angle with respect to an eye direction, wherein a sheet center of the inclination sheet is formed on a line between the measurement point and a prism center of the prism, a first surface including the sheet center, the prism center and the eye direction from the survey machine is obtained after the mark surface having the mark is imaged in the image-taking section and image-analyzed for obtaining the sheet center, a second surface is calculated having a normal line which is a normal line of the inclination sheet viewed in the eye direction from the survey machine, and an intersectional line between the first surface and the second surface is obtained, and the three-dimensional position of the measurement point is determined from a three-dimensional position of the prism obtained in the distance measuring section and the angle measuring section in a direction along the intersectional line by the fixed length, wherein the image-taking section includes a scene-taking section of shooting a surrounding scene of the prism, and a prism image-taking section of shooting the prism, a mark surface having the mark is imaged at the scene-taking section, and the inclination angle of the inclination sheet with respect to the eye direction from the survey machine is calculated by image-analyzing the mark surface, and the three-dimensional position of the measurement point is measured from a three-dimensional position of the prism obtained in the distance measuring section and the angle measuring section after imaging the prism with the prism image-taking section for collimating the prism, the inclination angle of the inclination sheet and the fixed length.

\* \* \* \* \*